(12) United States Patent
McBride et al.

(10) Patent No.: US 10,513,379 B2
(45) Date of Patent: Dec. 24, 2019

(54) ELECTRONIC STORAGE CABINET

(71) Applicant: Knox Associates, Inc., Phoenix, AZ (US)

(72) Inventors: James McBride, Peoria, AZ (US); Hans Rodrigues de Miranda, Surprise, AZ (US); Jason Pedersen, Glendale, AZ (US); Terry Mosier, Peoria, AZ (US); Bryan Edward Pavlovic, Cave Creek, AZ (US); Joshua Jacque Edberg, Phoenix, AZ (US)

(73) Assignee: Knox Associates, Inc., Phoenix, AZ (US)

( * ) Notice: Subject to any disclaimer, the term of this patent is extended or adjusted under 35 U.S.C. 154(b) by 0 days.

(21) Appl. No.: 15/852,326

(22) Filed: Dec. 22, 2017

(65) Prior Publication Data

US 2018/0186531 A1    Jul. 5, 2018

Related U.S. Application Data

(60) Provisional application No. 62/442,261, filed on Jan. 4, 2017.

(51) Int. Cl.
| | |
|---|---|
| *B65D 55/14* | (2006.01) |
| *E05B 65/52* | (2006.01) |
| *E05B 65/00* | (2006.01) |
| *G07C 9/00* | (2006.01) |
| *E05B 17/22* | (2006.01) |
| *G06Q 10/08* | (2012.01) |
| *A61J 1/00* | (2006.01) |

(52) U.S. Cl.
CPC .............. *B65D 55/14* (2013.01); *E05B 17/22* (2013.01); *E05B 65/0075* (2013.01); *E05B 65/52* (2013.01); *G07C 9/00722* (2013.01); *G07C 9/00912* (2013.01); *G07C 9/00944* (2013.01); *A61J 1/00* (2013.01); *A61J 2205/60* (2013.01); *B65D 2255/00* (2013.01); *G06Q 10/0832* (2013.01); *G07C 2009/0092* (2013.01)

(58) Field of Classification Search
None
See application file for complete search history.

(56) References Cited

U.S. PATENT DOCUMENTS

| | | |
|---|---|---|
| 3,988,909 A | 11/1976 | Catapano |
| 4,278,968 A | 7/1981 | Arnett et al. |
| 4,528,558 A | 7/1985 | Steers et al. |

(Continued)

FOREIGN PATENT DOCUMENTS

| | | |
|---|---|---|
| CN | 204858675 | 12/2015 |
| WO | WO 2011/100733 | 8/2011 |

OTHER PUBLICATIONS

International Search Report and Written Opinion for application No. PCT/US2017/068155, dated Mar. 19, 2018, in 17 pages.

(Continued)

*Primary Examiner* — John F Mortell
(74) *Attorney, Agent, or Firm* — Knobbe Martens Olson & Bear, LLP

(57) ABSTRACT

A storage container can include at least one movement sensor in or on a frame of the storage container and at least one movement sensor in or on a door of the storage container. A processor can compare outputs of the movement sensors to determine whether the door is open.

21 Claims, 17 Drawing Sheets

(56) References Cited

U.S. PATENT DOCUMENTS

| | | |
|---|---|---|
| 4,583,082 A | 4/1986 | Naylor |
| 4,663,621 A | 5/1987 | Field et al. |
| 4,686,912 A | 8/1987 | Fogleman et al. |
| 4,771,269 A | 9/1988 | Pasty et al. |
| 4,812,810 A | 3/1989 | Query et al. |
| RE33,960 E | 6/1992 | Neuman |
| 5,321,963 A | 6/1994 | Goldman |
| 6,084,511 A | 7/2000 | Kil |
| 6,873,931 B1 | 3/2005 | Nower et al. |
| 7,057,510 B2 | 6/2006 | Maniaci |
| 7,081,816 B2 | 7/2006 | Schebel et al. |
| 7,242,296 B2 | 7/2007 | Wang et al. |
| 7,262,698 B1 | 8/2007 | Frederick et al. |
| 7,394,369 B2 | 7/2008 | Horngren |
| 8,339,261 B1 | 12/2012 | Wolski |
| 8,354,927 B2 | 1/2013 | Breed |
| 8,860,568 B1 * | 10/2014 | Baker ............... G08B 13/06 340/3.1 |
| 10,034,527 B2 * | 7/2018 | Korey ............... A45C 5/03 |
| 2007/0194916 A1 | 8/2007 | Hewitt et al. |
| 2009/0141117 A1 | 6/2009 | Elberbaum |
| 2010/0300130 A1 * | 12/2010 | Shoenfeld ........... A61B 50/10 62/129 |
| 2010/0326145 A1 | 12/2010 | Powers et al. |
| 2011/0179864 A1 | 7/2011 | Raasch et al. |
| 2015/0330140 A1 | 11/2015 | Kincaid et al. |
| 2016/0168899 A1 * | 6/2016 | Scheiermann ..... G08B 13/1663 49/506 |
| 2017/0140646 A1 * | 5/2017 | Lu .................. G08B 21/18 |
| 2018/0172722 A1 * | 6/2018 | He .................. G01C 21/10 |

OTHER PUBLICATIONS

Fisher, Christopher J., "Using an Accelerometer for Inclination Sensing", Digi-Key Electronics, http://www.digikey.com/en/articles/techzone/2011/may/using-am-accelerometer-for-inclidnation-sensing, pp. 1-11, May 6, 2011.

* cited by examiner

ELECTRONIC STORAGE CABINET

INCORPORATION BY REFERENCE TO ANY RELATED APPLICATIONS

Any and all applications, if any, for which a foreign or domestic priority claim is identified in the Application Data Sheet of the present application are hereby incorporated by reference under 37 CFR 1.57.

BACKGROUND

Boxes and cabinets used in emergency vehicles contain drugs, and these boxes and cabinets have mechanical locking mechanisms in place that are intended to prevent people from accessing those drugs. However, it is easy to pretend to close the lock on these boxes and cabinets while having the door still open, for example by flipping the bayonet of the locking device over to allow the box and/or cabinet to appear locked when it is not.

In the normal construction of a locked box or cabinet, the assumption is that when the lock is engaged the box or cabinet is actually locked. However, mechanical gears can be easily manipulated to fool the box or cabinet to think the bolt is engaged while the door is open. Thus, any sensors that are based on the position of mechanical locking mechanisms can also be fooled. In other words, when using only mechanical locking mechanisms, it is possible to have the bolt extended but for the box or cabinet to not be really locked. For applications where the contents of the box or cabinet need to be absolutely secured, mechanical locking gears are not sufficient.

SUMMARY OF CERTAIN EMBODIMENTS

In certain embodiments, a storage container includes a frame that defines a partially enclosed space that can receive medical pharmaceuticals (or other articles). The frame can define an opening. A door can be mounted to the frame so as to be movable between an open position, whereby access to the medical pharmaceuticals can be obtained, and a closed position whereby the medical pharmaceuticals (or other articles) can be secured within the partially enclosed space. A locking mechanism can secure the door to the frame in the closed position. Further, the a lock verification system of the container can include a first accelerometer disposed in the door and that can generate a first output, a second accelerometer disposed in the frame and that can generate a second output, and a processor programmed to perform a calculation based on the first output and the second output to identify whether the door is open or closed. In one embodiment, the processor can be further programmed to: compute a first tilt angle based on the first output, compute a second tilt angle based on the second output, compute a difference between the first tilt angle and the second tilt angle, and compare the computed difference with a threshold to identify whether the door is open.

In certain embodiments, the storage container of the preceding paragraph may be combined with any combination of the following features: the processor can be further programmed to filter one or both of the first output and the second output prior to computing the first tilt angle and the second tilt angle; the container can further include a magnetic sensor and a magnet, where one of the magnetic sensor and the magnet disposed in the door and the other disposed in the frame, such that when the door is closed, the magnet is brought into proximity with the magnetic sensor such that the magnetic sensor detects the magnet; the magnetic sensor can include either a reed switch or a Hall effect sensor; the processor can also analyze an output of the magnetic sensor to identify whether the door is open or closed; the processor can also obtain the first output and the second output in response to the magnetic sensor detecting the magnet; the processor can also increase a sample rate of the first and second accelerometers in response to the magnetic sensor detecting the magnet; the container can also include a lock sensor that can detect whether the locking mechanism has actuated; the lock sensor can include a switch; the frame can include a recess having one or more ports or holes; the recess can be disposed in a rear portion of the frame opposite a front portion of the frame that connects to the door; the recess can extend partially along an upper portion of the frame; the recess can include one or more of the following: a power cable port, a network cable port, and a wireless antenna port; the recess can be defined by a shelf adjoining two walls, each wall adjoining the other, wherein a normal vector to planes defined by the shelf and the two walls are approximately orthogonal to each other; the cabinet can include an upper surface, a bottom surface opposite the upper surface, left and right side surfaces, a rear surface, and a door opposite the rear surface; and the recess can include a wall extending downward from the upper surface partially toward the bottom surface and a shelf extending forward from the rear surface toward the door, wherein the shelf and the wall intersect to at least partially form the recess.

In certain embodiments, a storage container can include: a frame that defines a space configured to receive one or more items, wherein the frame defines an opening; at least one door mounted to the frame so as to be movable between an open position, whereby access to the one or more items can be obtained, and a closed position whereby the one or more items can be at least partially enclosed; a locking mechanism that secures the at least one door to the frame in the closed position; and a lock verification system that can include: at least one first movement sensor disposed in the at least one door and configured to generate a first output, at least one second movement sensor disposed in the frame and configured to generate a second output, and a processor programmed to perform a calculation based on the first output and the second output to identify whether the at least one door is open or closed.

In certain embodiments, the storage container of the preceding paragraph may be combined with any combination of the features described in the preceding two paragraphs. In certain embodiments, the storage container of the preceding paragraph may also be combined with any combination of the following features: the storage container can be a shipping container; and the storage container can also include one or both of a wireless transmitter and a memory that stores data regarding identifications by the processor of door opening events.

For purposes of summarizing the disclosure, certain aspects, advantages, and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

BRIEF DESCRIPTION OF THE DRAWINGS

The features disclosed herein are described below with reference to the drawings. The drawings are provided to illustrate embodiments of the inventions described herein and not to limit the scope thereof.

DETAILED DESCRIPTION OF CERTAIN EMBODIMENTS

I. Overview

Figure 1:
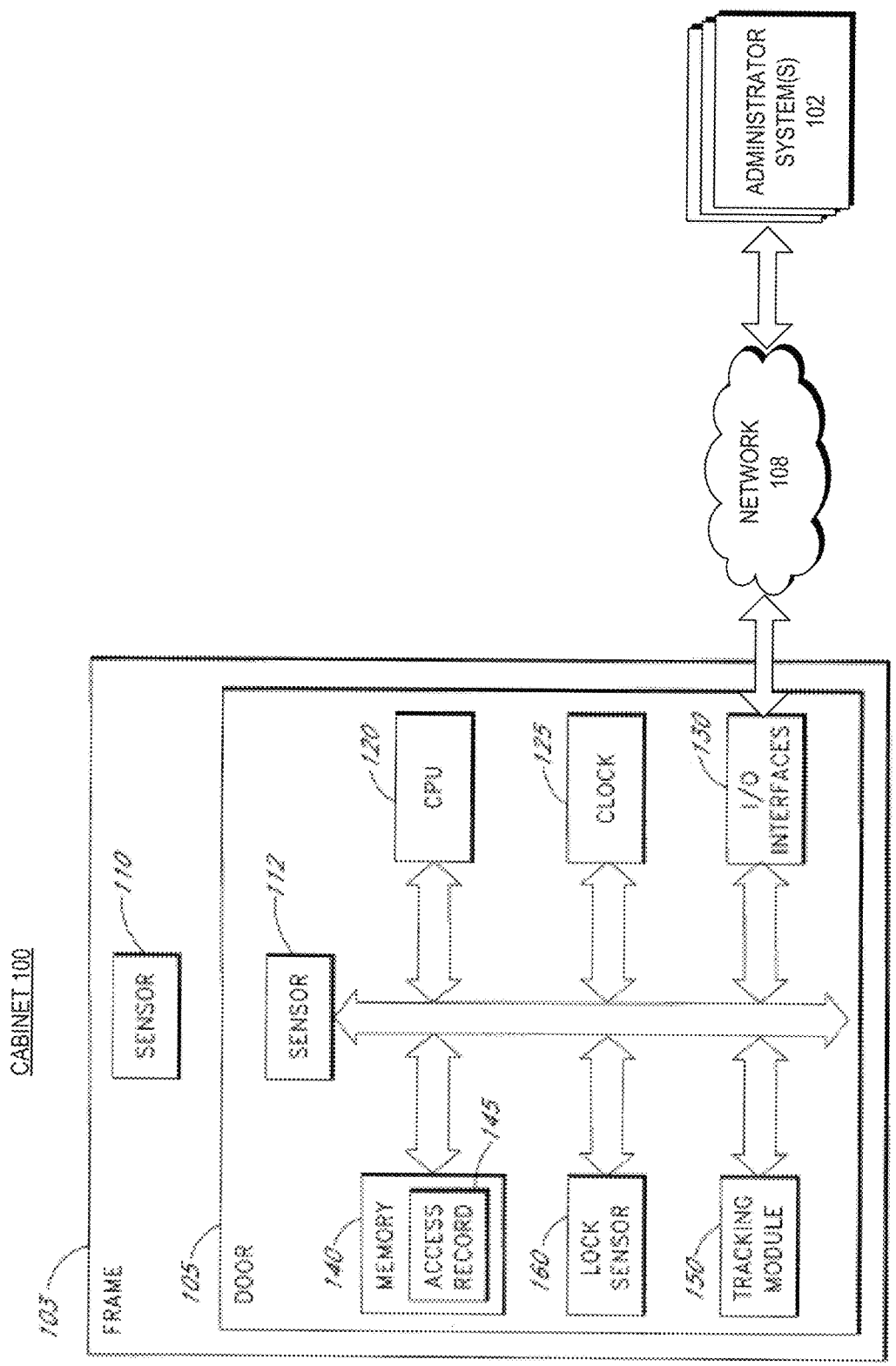
FIG. 1 is a block diagram illustrating one embodiment of a cabinet.

Many secure boxes and cabinets are fabricated from metal. Proximity sensors that communicate electromagnetically, such as through induction, do not operate well or at all with a box or cabinet that comprises metal. Furthermore, a proximity sensor that detects metal can be easily fooled by positioning metal nearby. Thus, there is a need for a locking validation mechanism that can confirm that the mechanical locking is indeed effective, such as by verifying that a door is closed and that a lock is engaged, and that can operate in an environment where it is substantially surrounded by metal.

Also, medical personnel must access the drugs contained in a box or cabinet during the course of duty to administer the drugs to a patient in need. Therefore, these medical personnel must have the ability to unlock the box or cabinet. However, once these medical personnel have the ability to access the drugs they may remove more of the drugs than is necessary for legitimate treatment of patients. For example, when responding to an emergency call, an emergency medical technician (EMT) may engage in an authorized access of the drugs in the box or cabinet but may remove more drugs than are needed to treat a victim and later engage in unauthorized use of the extra drugs. Or a health care employee with access to the cabinet may unlock the cabinet when no other people are nearby and remove some of the drugs for unauthorized purposes.

Therefore there is a need for a device that facilitates the auditing of any access made to the contents of a box or cabinet. Such a device would advantageously help determine who unlocked or opened the box or cabinet. Consequently, the device would help reduce unauthorized use of the contents of the box or cabinet, which would further reduce the costs of the supplier of the contents, for example by reducing the costs of stocking the box or cabinet with pharmaceuticals. The device would also help reduce the risk of injury to users who may be engaging in unauthorized use of the contents by impairing the access of such users to the contents.

Existing medical cabinets have many flaws that compromise their ability to track unauthorized accesses. Many cabinets have electronic locking mechanisms that are actuated by a user, for instance an EMT or paramedic who needs to access controlled substances in the security cabinet. Many cabinets do not have adequate safety measures to prevent unauthorized access. Even existing cabinets that do have such mechanisms often are inadequate because these mechanisms are either easily compromised, are difficult to manufacture, or simply do not work as well as intended.

It is possible to dispose a magnet and a corresponding magnetic sensor in a door and frame of a cabinet. The magnetic sensor can sense when the door is opening or closing based on movement of the magnet (e.g., in the door) away from the magnetic sensor. However, a magnetic sensor can easily be defeated by passing a separate magnet near the magnetic sensor to fool the magnetic sensor into indicating that the box is closed.

More complex electromagnetic sensors also have defects. For instance, radiofrequency identification sensors (RFID) may not provide many additional benefits over magnetic sensors. While RFID sensors may not be so easily fooled as a magnetic sensor, they require tight tolerances to function properly, and thus often fail to do so. For instance, one currently available cabinet incorporates an RFID sensor in a frame and a corresponding RFID sensor in a door. When the door is closed, the two sensors are brought into proximity, and door closure is theoretically detected. But in order to detect door closure, the two sensors must be positioned very close together, and manufacturing tolerances may result in imprecise sensor positioning. In addition, wireless sensors are often inaccurate. Accordingly, there may be inconsistent data transfer between RFID sensors.

Advantageously, in certain embodiments, this disclosure describes different sensors that can be used in a storage cabinet, such as a medical cabinet, which may overcome some or all of the deficiencies of existing sensors. In one embodiment, an accelerometer may be placed in the door of the cabinet or box and another accelerometer may be placed in the frame of the box. A processor can analyze outputs of the two accelerometers to ascertain whether the door is open or closed. For instance, the processor can compare differences in the outputs from each accelerometer to confirm whether the door is open. In one embodiment, the processor calculates tilt angles based on the output of each accelerometer and compares a difference between the tilt angles with a threshold to determine whether the door has tilted open or closed.

If the box were installed in a stationary location, such as in a hospital or other clinical facility, a single accelerometer in the door may be sufficient to determine whether the door is opened or closed. A box in such a fixed location may generally rely on the stationary force of gravity applied to the sensor in order to ascertain door openings. But many such boxes are placed in emergency medical vehicles, like ambulances. As a vehicle travels, acceleration of the vehicle and changes in terrain may cause different forces other than the force of gravity to be applied to the accelerometer. Accordingly, a single sensor may be insufficient to confirm whether the box is open. However, if accelerometers are present in both the frame and door, then the output of these two (or more) accelerometers can be compared to generally cancel out sensor fluctuations created by vehicle movement or variations in terrain travelled by the vehicle.

The accelerometers can advantageously be hidden from a user, since they may be placed anywhere in the door and the frame. In particular, since accelerometers detect gravitational and other acceleration forces, which are not blocked by the metal material of most cabinets, the accelerometers need not be exposed to users. Further, accelerometers may be more accurate at indicating door opening than RFID sensors.

The embodiments described are not limited to medical storage cabinets, but can generally be applied to any container. For ease of illustration, however, this specification primarily focuses on medical storage cabinet examples. Toward the end of this specification, an additional example in the form of a shipping container is also provided. Additional examples of containers that can implement the features described herein include safes, lock boxes (e.g., that hold keys for emergency personnel access), any cabinet (e.g., on a vehicle, ship, plane, or other moving conveyance, or even in a building or typically stationary area), and the like.

II. Example Medical Cabinet

Reference will now be made to the drawings, wherein like numerals refer to like parts throughout. FIG. 1 is a block diagram illustrating one embodiment of a secure box or cabinet 100 for holding items such as pharmaceutical products. The cabinet 100 includes a frame 103 that creates a storage space, for example for storing pharmaceutical products. The cabinet 100 also includes a door 105 mounted to the frame 103. The door 105 may be opened to allow access to the contents of the frame 103 or closed to restrict access to the contents of the frame 103. The frame 103 and/or door 105 may be made of materials that are durable enough to resist an attempt to physically breach the cabinet 100, and in one embodiment are made of a metal, such as, for example, steel or aluminum. The door 103 and frame 105 also include a locking mechanism to secure the door 103 in the closed position to prevent access to the contents of the cabinet 100. The locking mechanism may be any suitable lock and may be operated by any suitable interface, for example, mechanical key, mechanical combination, biometric data, electronic key, keypad, or a touch screen interface.

The cabinet 100 may be mounted in any suitable location, including in a clinical facility or emergency vehicle (such as an ambulance). However, uses for the cabinet 100 extend beyond the medical field. The cabinet 100 may be used in any suitable application where security and tracking access to the cabinet 100 is useful, including, for example, as evidence lockers in police stations or police vehicles.

In FIG. 1, the cabinet 100 also includes a lock verification system. The lock verification system can include a first sensor 110 that is mounted in the frame 103 and a second sensor 112 that is mounted in the door 105. The sensors 110, 112 may be movement sensors, such as accelerometers, gyroscopes, tilt sensors, global positioning sensors (GPS), other position sensors, or the like. For convenience, the remainder of the specification will refer to the sensors 110, 112 as accelerometers. However, it should be understood that in each instance where accelerometers are described, other similar movement sensors may be used in their place.

In one embodiment, each accelerometer is a 1, 2, or 3-axis accelerometer. For convenience, this specification will refer to embodiments using 2-axis and 3-axis accelerometers. However, it should be understood that a single-axis accelerometer can be used in some embodiments. In one embodiment, the door accelerometer (sensor 112) outputs a signal which may be converted to a tilt-angle by a processor (CPU 120). Similarly, the processor 120 may convert an output signal from the frame accelerometer (sensor 110) into a tilt angle. If the tilt angles are the same or similar between the door and the box, then the processor 120 may consider the door to be closed. However, if the processor 120 detects a difference (e.g., above a threshold) in tilt angle between the door and the frame accelerometers, then the processor 120 can indicate that the door has been opened. The processor 120 may provide this indication on a display on the box, to a separate device within wireless range, or may output this indication over a network 108 for presentation to a user of an administrative system 102.

Advantageously, in certain embodiments, because the cabinet 100 includes accelerometers in both the door 105 and the frame 103, the relative position between those accelerometers is the quantity the processor 120 analyzes to determine whether the door is open. Taking the difference of the accelerometer outputs can reduce the effects of noise on each sensor from vehicle position or movement or other vibrational noise. Because the accelerometers can be placed anywhere within the door 105 or frame 103 (as gravity works through metal, unlike electromagnetic fields), they may perform detection of door opening or closing more accurately than RFID sensors that must be brought in proximity to one another in order to work. Because the accelerometers may be hidden from view, a user may not be able to easily find them and tamper with them, unlike other types of sensors. For similar reasons, the user may not be able to tamper with the accelerometers like a mechanical switch or magnetic sensor. Accordingly, in certain embodiments, accelerometers disposed in the door 105 and frame 103 of the cabinet 100 can provide a more accurate solution for determining door open and close events for tracking and auditing purposes.

The embodiment in FIG. 1 also includes a lock sensor 160. The lock sensor 160 detects the actuation state of the lock and generates a signal that indicates if the lock is actuated and/or if the lock is not actuated. For example, if the lock includes bolts that are extended when the lock is actuated, the lock sensor 160 detects when the bolts are extended and may generate a signal indicating the extension of the bolts. Also, the lock sensor 160 may generate a signal that indicates that the bolts are not extended.

Further, in one embodiment, the sensor 110 can be a magnetic sensor and the sensor 112 may be replaced with a magnet. The magnetic sensor may be reed switch, Hall effect sensor, or the like, which can detect when the magnet in the door 105 is close. The position of the sensors may be reversed such that the magnetic sensors in the door 105 and the magnet is in the frame 103. The magnetic sensor may be used to detect door opening and closing events, much like accelerometers may be used. Further, in one embodiment (see, e.g., FIG. 6B) both the magnetic sensor and corresponding magnet together with accelerometers are disposed in the cabinet 100. Using both the magnetic sensor and accelerometers can improve door open and close detection, as described in greater detail below.

In the embodiment shown in FIG. 1, the door 105 includes a CPU 120 (described above), which may include one or more microprocessors, and a clock 125. The door 105 also includes input/output (I/O) devices and interfaces 130. The I/O devices and interfaces 130 may allow other computing devices to communicate with the cabinet 100 through a wired or wireless link, for example to retrieve data, modify software executable software, or upload data, and may include commonly available interfaces (e.g., USB, Firewire, SCSI, etc.) or a proprietary interface. Also, the I/O devices and interfaces 130 may allow a user to directly communicate with the cabinet 100. Such interfaces include by way of example keypads, screens, speakers, card readers, and biometric data readers. The cabinet 100 may permit communication between the locking mechanism and the I/O devices and interfaces 130 in order to require a user to provide an identifier, for example an identification code (e.g. a PIN number) or magnetic identification card, provide biometric data, and/or provide pharmaceutical information, for example, the type and/or quantity of the pharmaceutical being removed from the cabinet, in order to disengage the locking mechanism.

Also in FIG. 1, the cabinet 100 includes a memory 140. The memory 140 may include volatile and/or nonvolatile memory, such as a random access memory ("RAM"), a flash memory, and/or a hard drive. The memory 140 includes an access record 145. The access record 145 may contain a log of some or all of the instances when the door 105 was secured or unsecured, which may include the instances when the sensors 110, 112 detect door opening or closing and the instances when the locking mechanism is actuated or de-actuated, as well as the times of the instances. The log may be a time log indicating the date and time the cabinet 100 was secured or unsecured. The memory 140 may also include additional data, for example data related to control of the inventory of the cabinet 100. The additional data may include data regarding the contents of the cabinet 100, such as type of and quantity of pharmaceuticals added to the cabinet, the identification of the user who unlocked the cabinet 100 at a particular time (e.g., based on that user using their individual code to access the cabinet 100), a log of the person responsible for the cabinet at a given time (e.g., doctor, nurse, ambulance driver, emergency medical technician), and the type and quantity of pharmaceutical that the authorized person indicated was being removed during an access of the contents of the cabinet.

In the embodiment of FIG. 1, the cabinet 100 includes a tracking module 150. In general, the term "module," in addition to having its ordinary meaning, is used herein to refer to logic embodied in hardware, firmware, and/or software, such as software instructions or program code. The tracking module 150 may be executed by the CPU 120 to determine if the sensors 110, 112 detect a door opening or closing and/or determine if there is a change in the state of the actuation of the lock (based on input from the lock sensor 160). In one embodiment, the tracking module 150 is implemented in a real-time operating system (RTOS) or other operating system executing on the CPU 120.

The tracking module 150 may receive a signal from one or both of the sensors 110, 112 indicating a change in the sensors' values, and/or the tracking module 150 may intermittently or periodically poll the sensors 110, 112. The tracking module 150 may also receive a signal generated by the lock sensor 160, for example by polling the lock sensor 160. Also, the tracking module may access the clock 125 to determine the time it received any signal or performed any polling. The tracking module 150 may determine that the door 103 is secured when the sensors 110, 112 detect a closed-door and the lock sensor 160 indicates that the lock is actuated. The tracking module 150 may store any of this information in the access record 145 stored in the memory 140.

Although not shown, the cabinet 100 may also include a backup battery that allows the processor 122 to continue to monitor the state of the door 105 even when power is no longer provided externally to the cabinet 100. Advantageously, in certain embodiments, the sensors 110, 112 may be selected to reduce power requirements and thereby save battery life, promoting increased security in power outage situations. For instance, accelerometers may use less power than RFID sensors. The optional magnetic sensor may be a reed sensor instead of a Hall effect sensor for a similar reason, as reed sensors do not typically require power to operate.

Figure 2:
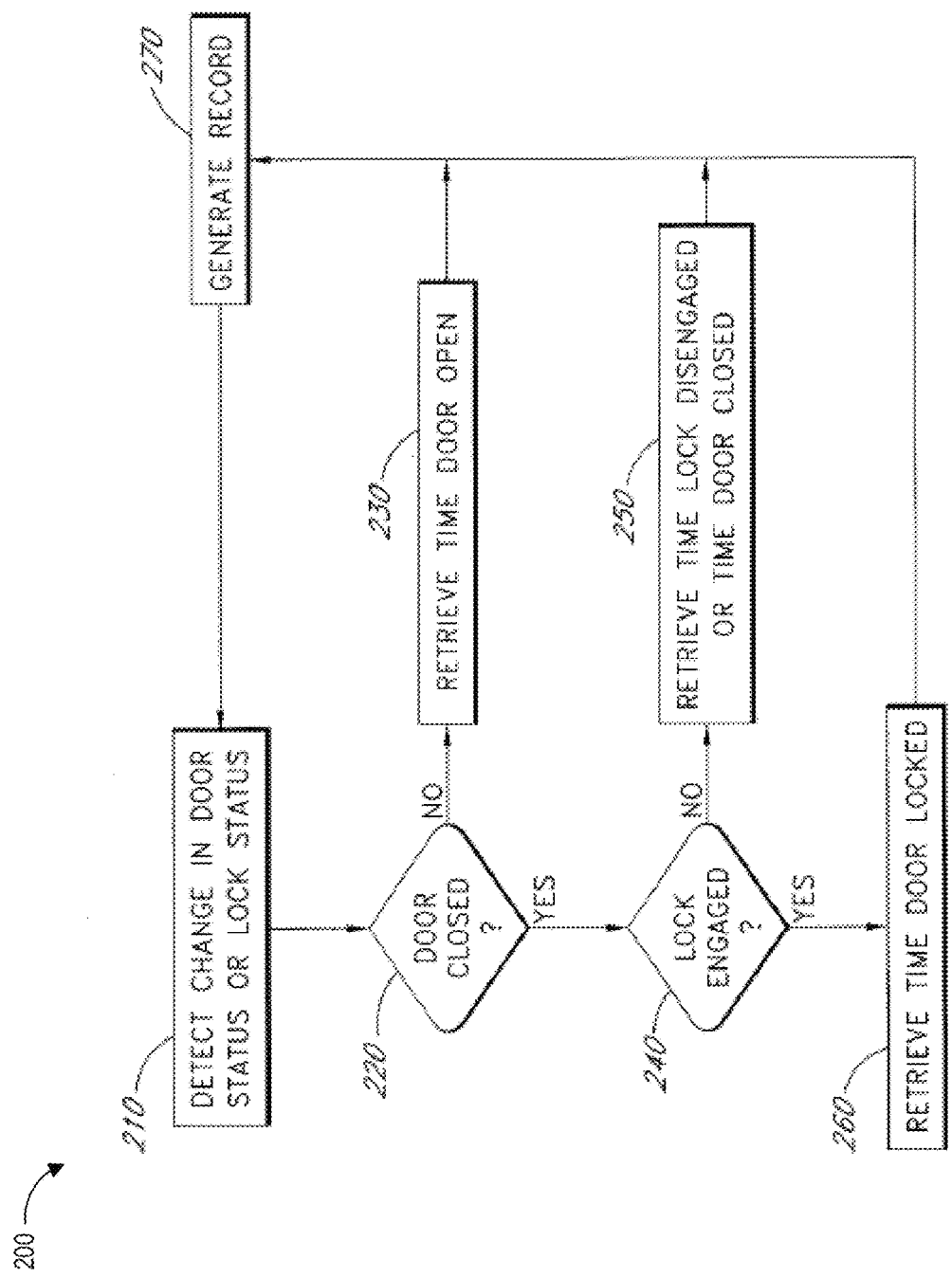
FIG. 2 is a flowchart illustrating one embodiment of a method of generating an access record.

FIG. 2 is a flowchart illustrating one embodiment of a process 200 of generating an access record. The process 200 may be implemented by the CPU 120 described above. More generally, the process 200 may be implemented by any cabinet described herein, or the like.

At block 210, a change is detected in the status of a door or the status of a lock. For example, a lock may transition from locked to unlocked or vice versa, or a door may transition from open to closed or vice versa. If a change in the status of the door or lock is detected, the process 200 proceeds to block 220.

At block 220, a determination is made if the state of the door has changed between open and closed. Sensors 110, 112 may be used to detect the change and/or determine if the door is open or closed. If at block 220 the door has changed to opened, the process 200 proceeds to block 230 where the time that the door was opened is retrieved, and the process 200 then proceeds to block 270. If at block 220 the state of the door is closed, the process 200 proceeds to block 240.

At block 240, a determination is made if the lock is engaged. This determination may be based at least in part on the signal from the lock sensor. If the lock is not engaged, the process 200 proceeds to block 250. At block 250, a determination is made if the lock was previously engaged or if the door was previously open. If the lock was previously engaged, the time the lock was disengaged is retrieved. If the door was previously open, the time the door was closed is retrieved and the process 200 proceeds to block 270. At block 260, the time that the door was locked is retrieved, and the process 200 proceeds to block 270. The processor may generate the record of the door being closed prior to determining whether the lock is engaged in state 240.

At block 270, a record is generated indicating the change in the status of the door or lock and the time of the change, for example by generating or adding information to the access record 145. In one embodiment, the record indicates if the door is secure or unsecure, for example when both the door is closed and the lock is engaged, though in other embodiments the record may indicate the individual statuses of the lock and the door. If the record only indicated that the door was secured or unsecured, after retrieving the time that the door was locked at block 260, at block 270 a record would be generated indicating that the door was secured as the of time retrieved at block 260, and after retrieving the time at blocks 250 or 230 a record would be generated indicating that the door was unsecured as of the time retrieved at block 250 or 230.

This record may later be retrieved and used to determine the times that the door 105 was secured or unsecured and opened or closed and/or the times that the lock was engaged or disengaged. This record advantageously allows the later auditing of the accesses of the contents of the cabinet 100, such as to determine who accessed the contents of the cabinet and what was removed from the cabinet.

Figure 3:
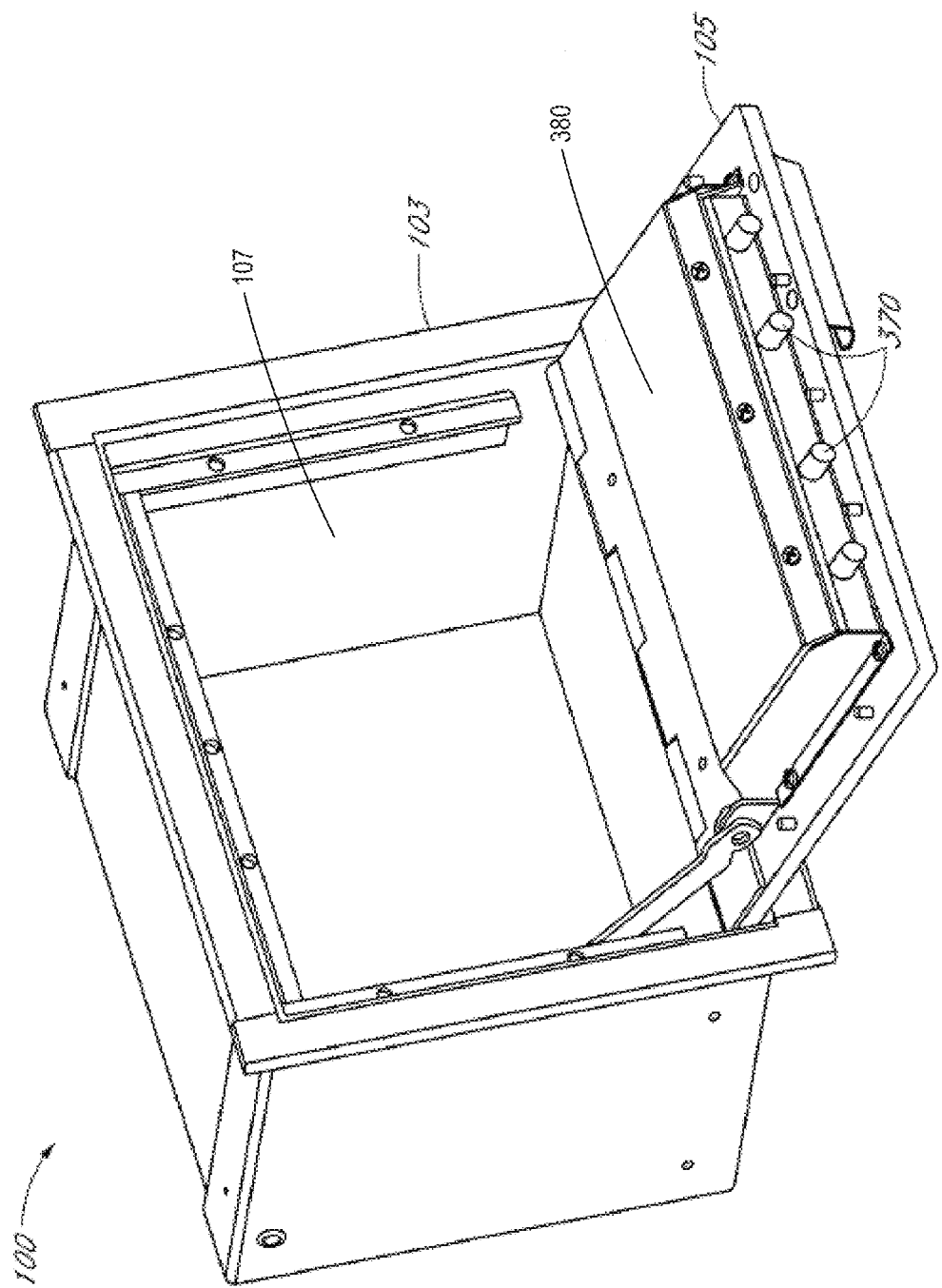
FIGS. 3 and 4 are perspective views of one embodiment of a cabinet.
Figure 4:
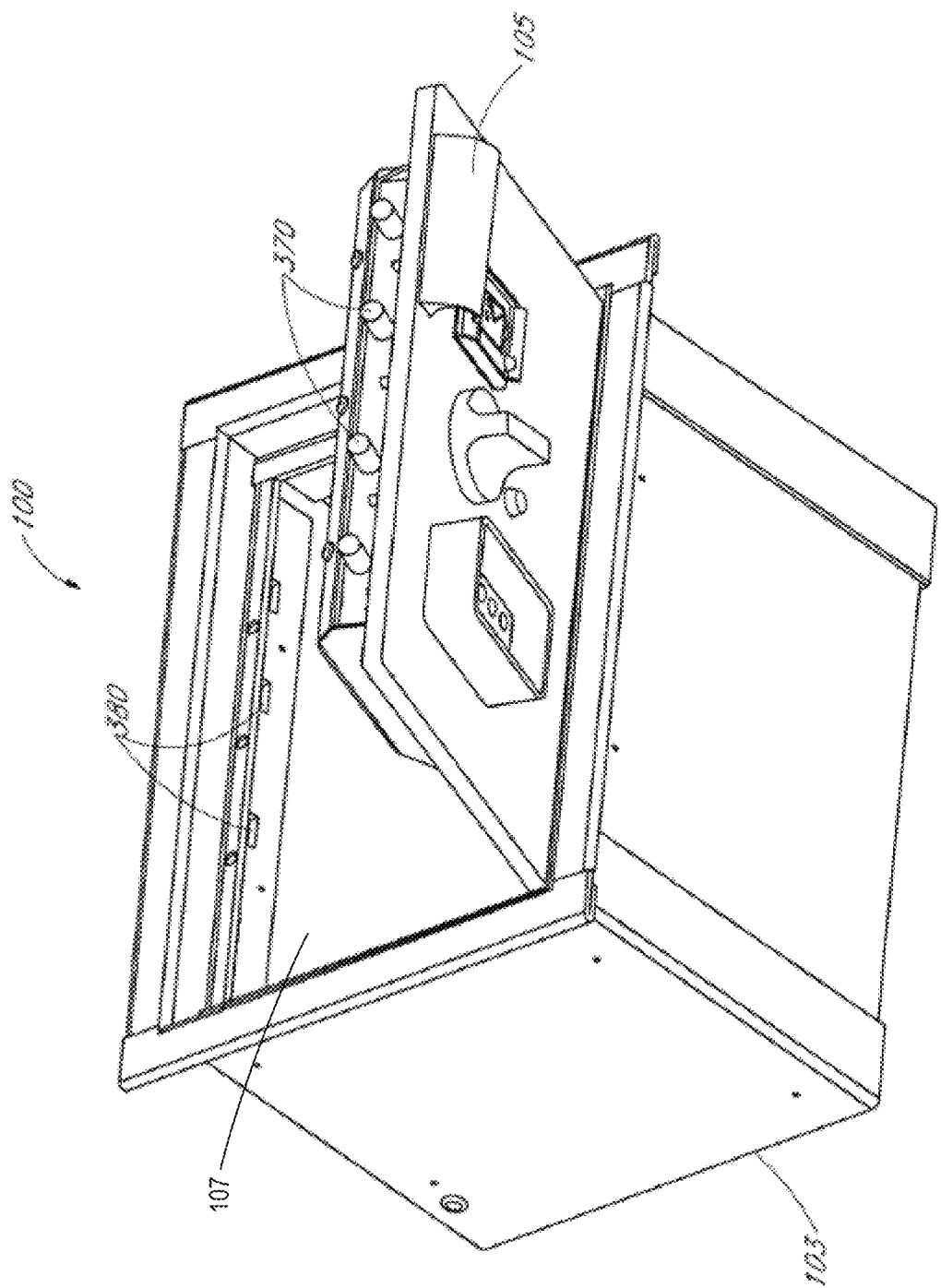

FIGS. 3 and 4 are perspective views of one embodiment of an example cabinet 100 with open door 105. The space 107 created by the frame 103 is also illustrated in FIGS. 3 and 4. The door 105 includes one or more engaging member 370, which may comprise a bolt, for example. The frame 103 includes one or more receptacles 380 that correspond to the engaging members 370 and that can receive the engaging members 370. When the door 105 is in the closed position relative to the frame 103 and the lock is engaged, the engaging members 370 are positioned within the corresponding receptacles 380, thereby securing the door 105 in the locked position. The sensors 110, 112 are not shown in FIGS. 3 and 4 because accelerometers, for instance, may be hidden from view. Magnetic sensors may also be hidden or at least partially hidden from view.

III. Example Accelerometer Usage

Figure 5:
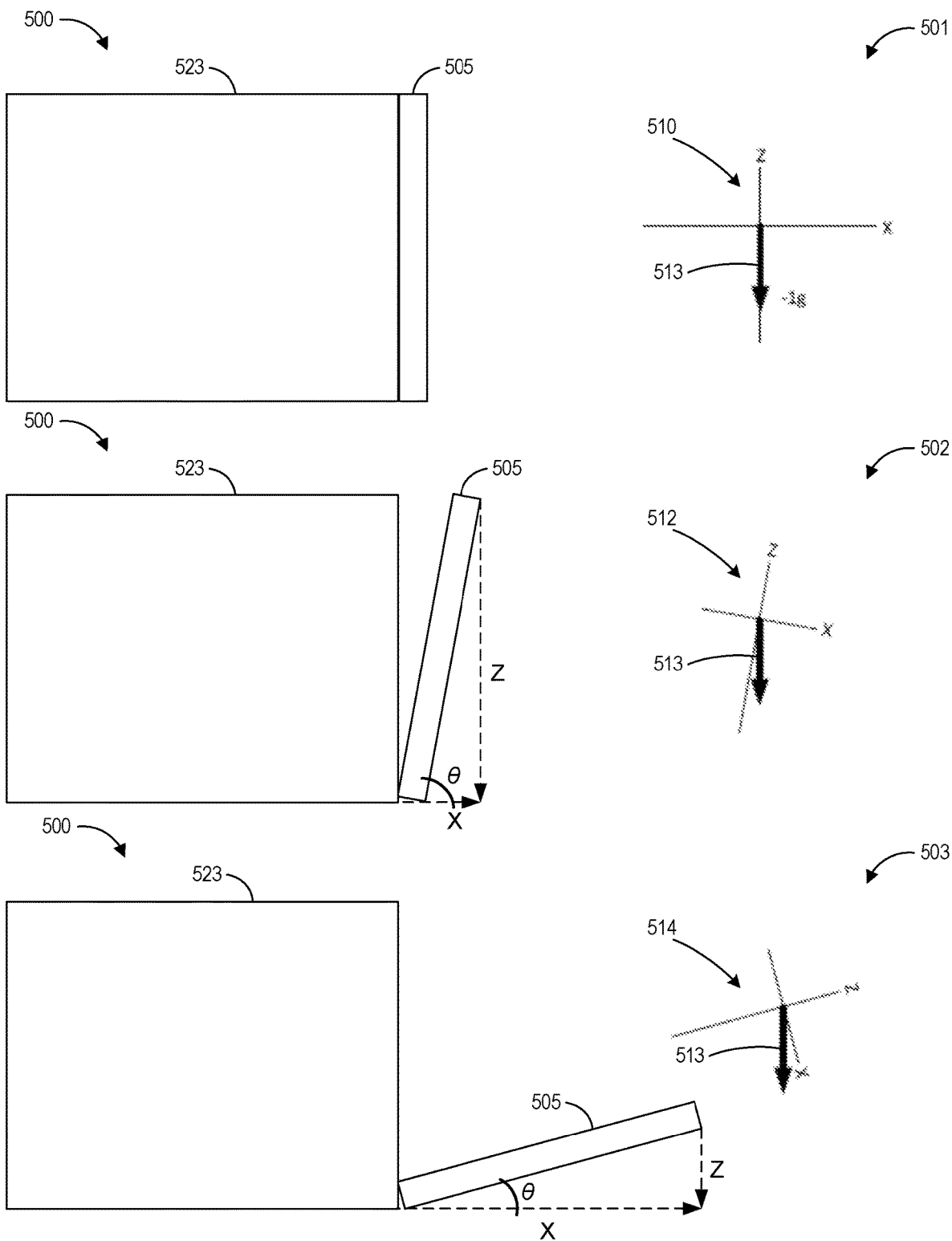
FIG. 5 is a block diagram illustrating example positions of the door and associated sensor outputs.

Example usages of accelerometers in a cabinet will now be described with respect to FIGS. 5 through 6B. FIG. 5 depicts three example scenarios 501, 502 and 503 in which an example cabinet 500 (side view) is shown. The cabinet 500 includes a frame 523 and a door 505 in each scenario 501, 502, 503. The cabinet 500 schematically represents another embodiment of the cabinet 100 described above.

Each scenario 501, 502 and 503 depicts the door 505 of the cabinet 500 in a different state. In the scenario 501, the door 505 of the cabinet 500 is closed. In the scenario 502, the door 505 has started to open slightly, and in the scenario 503, the door 505 has opened almost completely. Each scenario is also shown together with a coordinate plane 510, 512, or 514. Each coordinate plane 510, 512, or 514 depicts a vector 513 that depicts an example output of the accelerometer in the door 505 for each scenario 501, 502 and 503.

Each coordinate plane 510, 512, 514 is represented as a coordinate plane with x- and z-axes representing x- and z-axes of a three-axis accelerometer. As described above, accelerometers with one or two axes may be used in some embodiments to perform the features described herein. Nevertheless, for illustration purposes, FIG. 5 depicts the output of a three-axis accelerometer. In some embodiments, accelerometers sense gravitational (g) forces in one or more axes. In addition, accelerometers in the cabinet may experience acceleration forces from movement of the vehicle housing the cabinet, vibrations in the road, and the like. Nevertheless, for ease of description, the following description will refer solely to the static gravitational force or acceleration detected by the sensor. The effective dynamic acceleration from a moving vehicle or the like on the sensor may be approximately canceled out by subtracting the outputs of the two sensors (or subtracting tilt angles calculated from the outputs of the two sensors) as described below with respect to FIG. 6A.

The force of gravity reference is represented as the vector 513 on each coordinate plane 510, 512, 514. The force of gravity has a scalar value represented by −1 g, which has a standard acceleration of −9.8 meters per second (m/s) (the negative sign representing downward acceleration toward the earth). This force of gravity acts on the accelerometer regardless of the position of the accelerometer. (Although the force of gravity is not uniform over the surface of the earth, for most purposes it may be considered uniform as an approximation.)

Manipulating the accelerometer output along the two axes shown in the coordinate systems 510, 512 and 514, using for example trigonometry (or one or more stored trigonometric table(s)), a processor in the cabinet 500 can determine the tilt angle of the door 505. This tilt angle is represented by the Greek letter theta ($\Theta$) in scenarios 502 and 503. Although not shown, the tilt angle in scenario 501 would be 90 degrees because the tilt angle is drawn with respect to a vertical axis and a horizontal axis (the vertical axis being approximately parallel to the face of the door in the closed position and the horizontal axis being approximately parallel to the bottom surface of the cabinet 500).

In the scenario 501, the door is closed, and on the coordinate plane 510, the x- and z-axis outputs are as follows: z=−1 g; x=0. These outputs result in the gravity acceleration vector 513 pointing straight down along the z-axis. In the scenario 502, the door 505 is open slightly, and the position of the accelerometer is represented by the coordinate plane 512. There, the z-axis is tilted in parallel with the door 505, representing the position of the accelerometer within the door 505. The x-axis is also tilted and is perpendicular with the x-axis. The force of gravity represented by the vector 513 still points down and has a magnitude of 1g, representing what the sensor detects as the door is tilted open. As the door rotates down, the sensor sees an increase along the x-axis and a decrease along the z-axis.

The tilt angle $\Theta$ may be computed by taking the arctangent (inverse tangent) of x divided by z, as shown in equation (1):

$$\Theta = \arctan(x/z) \tag{1}$$

The x and z vectors are shown superimposed next to the door 505 to show how $\Theta$ can be calculated using the arctangent. For example, if x=0.2 and z=0.98, the tilt angle $\Theta$ may be found as follows:

$$\Theta = \arctan(1.2/0.98) \tag{2}$$

which equals 11 degrees.

In the scenario 503, with the door 505 almost completely open, the coordinate plane 514 is also tilted to be nearly completely open (representing the position of the accelerometer within the door 505). The vector 513 still points downward in the direction of gravity. In an example, if x=0.985 in this scenario and z=0.174, the tilt angle is approximately 80 degrees using equation (1) described above.

In certain embodiments, the accelerometer within the frame 523 in each of the example scenarios 501, 502 and 503 outputs the same values in each scenario because the frame 523 has not moved. Rather, the door 505 has moved causing change to the output of the accelerometer. In ideal scenarios where noise is not present, the output of the accelerometer in the frame 523 would be a constant value. In a real-world scenario, noise—including noise due to motion of the cabinet 500—would cause the accelerometer values to fluctuate.

Ignoring noise for now (discussed below), the output of the accelerometer in the door 505 may be compared with the output of the accelerometer in the frame 523 to determine whether the box is open. For instance, the tilt angle can be calculated for both the accelerometer in the door 505 and in the frame 523. If there is a difference between these two angles, then the door may be considered to be open (or opening), assuming that the accelerometers in the door 505 and in the frame 523 are oriented in the same direction. If they are oriented in different directions, then the outputs of the accelerometers can be manipulated mathematically to determine whether the door is open or otherwise moving.

The example scenario of FIG. 5 depicts the door 505 opening from the top of the door and swinging downward. This is merely one example type of door that can implement the features described herein. Other doors that may implement the features described herein can open from the bottom, swinging upwards, or open from the side, swinging horizontally outwards. Likewise, double doors may be used in some cabinets (e.g., each swinging horizontally outwards, or with one swinging vertically upwards and one swinging vertically downwards). An example double door scenario is described below with respect to FIG. 16.

Figure 6A:
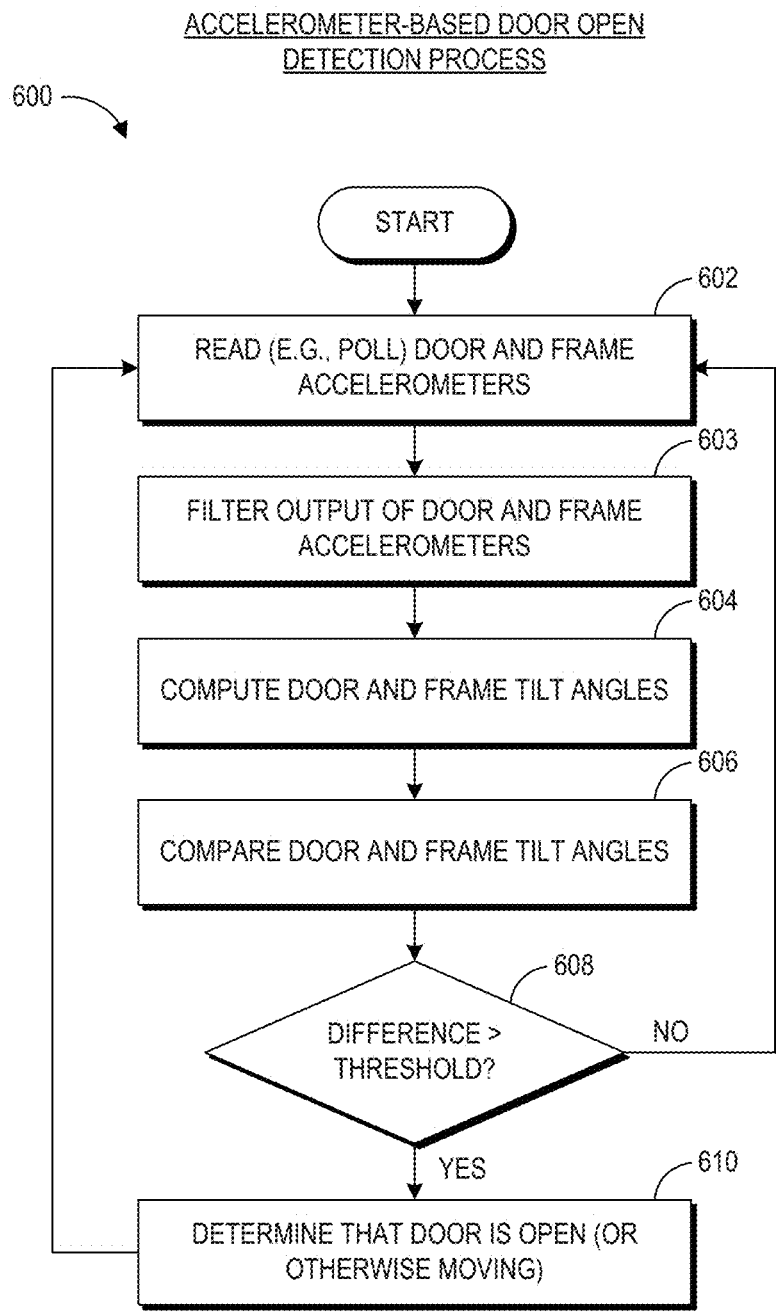
FIG. 6A is a flow chart illustrating an embodiment of an accelerometer-based door open detection process.

Turning to FIG. 6A, an example door open detection process 600 is shown. The door open detection process 600 may be implemented by any of the cabinets described herein. For example, the processor 120 (e.g., implementing the tracking module 150) may implement the process 600.

At block 602, the processor reads the door and frame accelerometers. At block 603, the processor optionally filters the output of the door and frame accelerometers. The filtering process may include any filtering that attenuates or otherwise reduces noise in the accelerometer signals. Reducing noise can attenuate the effects of noise on the calculation of the tilt angle output from each sensor. Typical sources of noise include vibration from the vehicle that may house the cabinet as well as general vibration sources within the earth.

The filter may be a low-pass filter, an averaging filter, a median filter, or the like. The filter may be implemented using digital signal processing techniques. In one embodiment, the processor 120 in the cabinet is a digital signal processor (DSP). In one embodiment, multiple processors are included in the box: a processor devoted to digital signal processing functionality and a general-purpose processor that performs other functionality associated with door opening detection and the management of the cabinet. Further, a separate processor may be dedicated to calculating tilt angles from the accelerometers. This separate processor may be part of a package including an accelerometer (and may be considered a tilt sensor by some sensor vendors).

At block 604, the processor computes door and frame tilt angles. For instance, the processor may compute tilt angles using the techniques described above with respect to FIG. 5 or other suitable mathematical techniques. At block 606, the processor compares the door and frame tilt angles. If the difference between these angles is greater than a threshold (block 608), the processor determines that the door is open at block 610. In one embodiment, the threshold is about 0.5 degrees, although other values may be chosen. A value too small risks false detections, while a value too large risks the door opening enough that someone can stick an object (e.g., to grab drugs) within a gap formed between the frame and the opening door. Otherwise the process 600 loops back to block 602 and continues to periodically read or poll the door and frame accelerometers.

At block 608, the difference between the door and frame tilt angles may be considered greater than some tolerance or threshold. If the threshold is too small or if no threshold were used, sensor noise, or variations in the sensor outputs, could cause the processor to generate false, fluctuating readings indicating that the door is frequently opening and closing. In other embodiments, precision sensors may be used at perhaps greater expense to the manufacturer of the cabinet, and a mere difference between those sensors may trigger an indication that the door is open, or the threshold or tolerance for that difference may be reduced. In one prototype, the accuracy of the accelerometers is such that a difference of 20 mils (about 0.5 mm) can be detected in positioning of the door. It is envisioned that with higher precision accelerometers that greater precision in detecting door movement may be achieved.

In some embodiments, the processor may poll the door and frame accelerometers frequently, e.g., many times within a given period of time so that a door opening event may be detected readily. If it is desired to reduce the load on the processor that such polling would entail, the frequency of the polling can be reduced. Reducing the load on the processor may be desirable because the processor may be performing multiple functions other than detecting door openings, including performing audit trail functions, handling communications, receiving user input as to what substances are removed from or added to the cabinet, and the like. However, in some embodiments, it may be desirable not to reduce the processor's polling frequency so low as to miss an unauthorized access of the cabinet. Accordingly, in some embodiments polling may occur as frequently as many cycles per second or as infrequently as once about every 100 ms to about 500 ms. It is estimated that a person may be able to open a box and remove its contents within about a second or two. Thus, in some embodiments, it may be desirable not to sample or poll the sensors less frequently than about once per second or about once every 500 ms.

Depending on the type of sensor, very fast sampling may be performed, such as 32 Hz or greater, creating a large number of samples per second. A large number of samples can be useful for filtering out noise. In another embodiment, (see, e.g., below with respect to FIG. 6B) the accelerometers are polled infrequently by the processor, but if the processor detects a door opening event by another sensor, then the processor reads values from the accelerometers. In another embodiment, the processor increases the sample rate or poll rate of the accelerometers in response to some external event such as detecting that the door is beginning to open from some other sensor (see FIG. 6B).

Further, in some embodiments, the processor can compare the outputs of the accelerometers directly instead of calculating tilt angles. For example, the processor can compute a difference between the raw output for each axis of each accelerometer and determine whether the difference for one or more axes exceeds the threshold. If the threshold is exceeded, the processor can indicate that the door was opened. For instance, the processor can compute the difference between the values output by the x-axes of the two accelerometers and can compute the difference between the two z-axes of the accelerometers. If either difference calculation exceeds a threshold, the processor could indicate that the door is open. The processor may also filter the raw output from each accelerometer prior to performing this difference calculation. Processing raw outputs and avoiding tilt angle calculations can save processing resources and reduce power usage.

Moreover, if the cabinet is stored in a stationary location, such as in a building instead of a vehicle, processing may be simplified. A single accelerometer may be located in the door. The processor can detect a door opening by identifying when one axis of the accelerometer changes value significantly (e.g., above a threshold). If a two or three axis accelerometer is used, the processor can detect door opening by identifying when one axis increases in value (e.g., above a threshold) while another axis decreases in value (e.g., below this threshold). (Of course, a second accelerometer may also be included in the frame, and the processor can compare the outputs of the second accelerometer with the accelerometer in the door.)

Figure 6B:
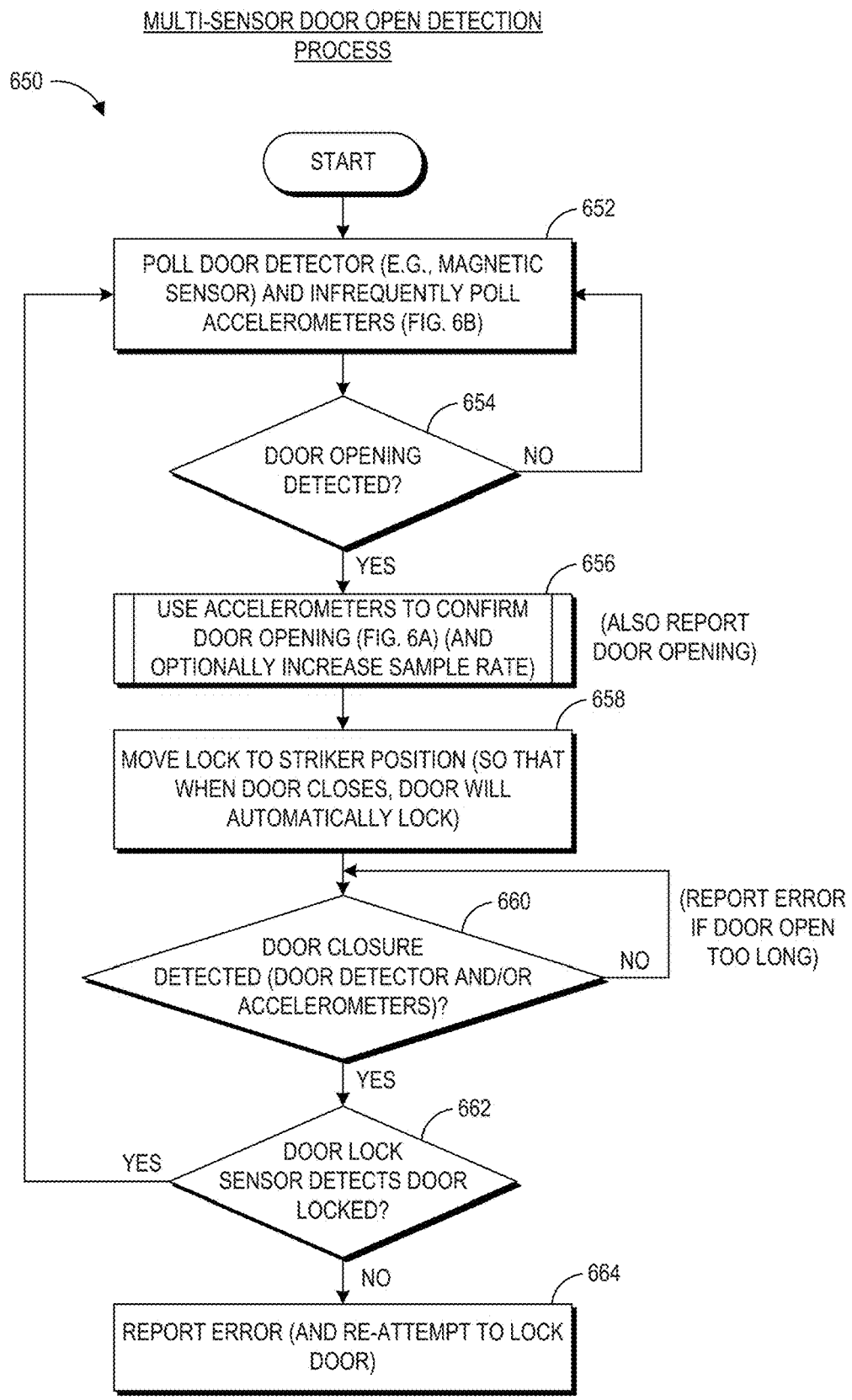
FIG. 6B is a flow chart illustrating an embodiment of a multi-sensor door open detection process.
Figure 7:
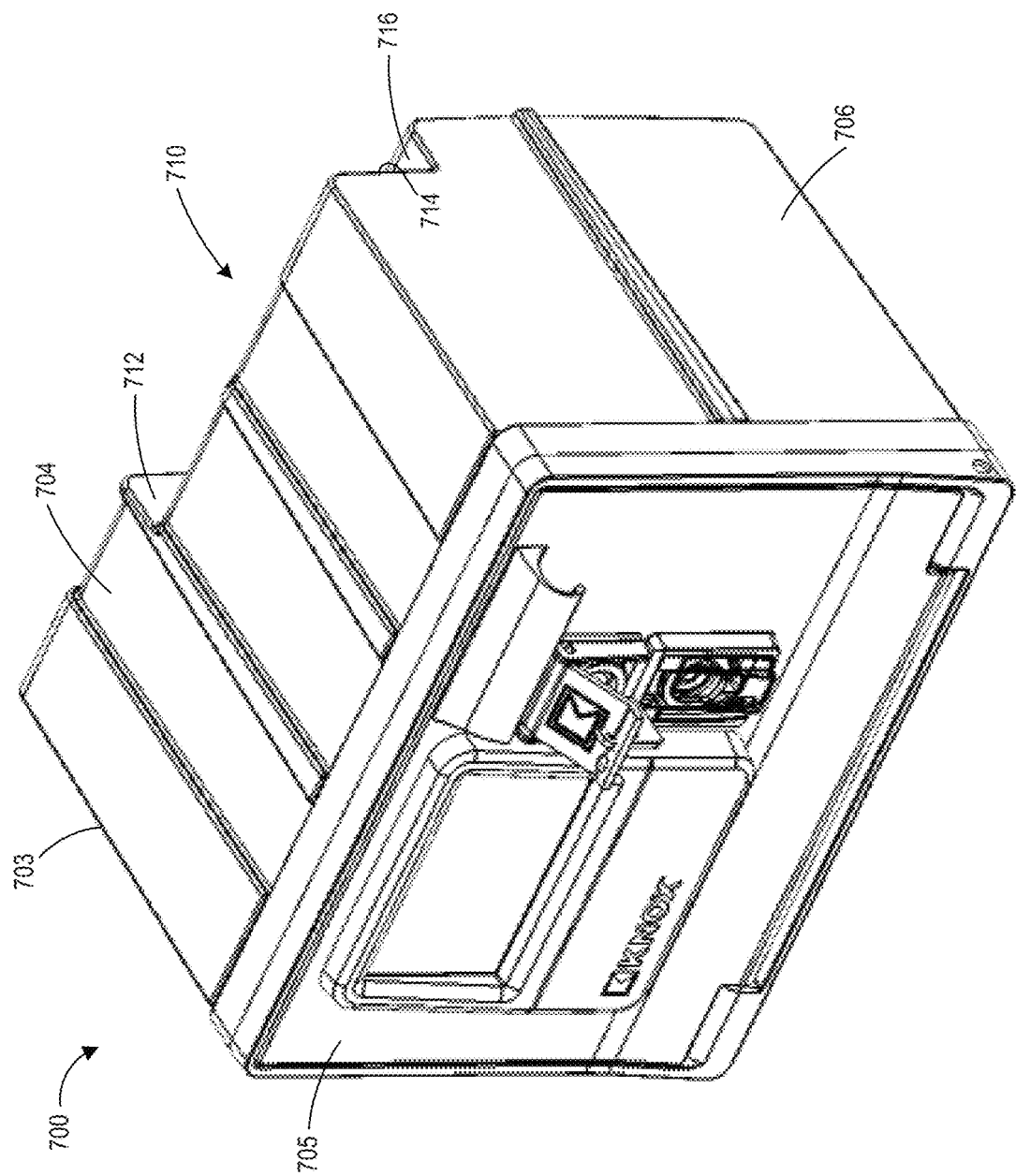
FIG. 7 is a front perspective view of an embodiment of a cabinet.

Turning to FIG. 6B, another example process 650 is shown. The process 650 is a multi-sensor door open detection process that combines the input of three separate sensors to analyze door openings, closings and locking events. Like the process 600 of FIG. 6A, the process 650 of FIG. 6B can be implemented by any processor of any of the cabinets described herein. The process 650 may further be implemented by the tracking module 150 in the processor.

At block 652, the processor polls a door detector, which may be, for example, a magnetic sensor. The magnetic sensor may be, for example, a magnetometer, a reed switch or Hall Effect sensor. The magnetic sensor may be placed in the frame near the portion of the door that contacts the frame when the door is closed and that swings away from the frame when the door is opened. A corresponding magnet may be located in the door, such that when the door is closed, the magnet is brought into proximity with the magnetic sensor. In some embodiments, the magnet is located in the frame and the magnetic sensor is located in the door instead.

When the door moves away from the frame, the magnetic sensor or door detector can detect that the door has moved away. One example purpose of the door detector is to further confirm the door has been opened or closed in addition to (or sometimes instead of) based on the information obtained from the accelerometers. As an alternative or additional option, an RFID sensor may be used. Regardless, having multiple sensors detect door opening (and closing) can advantageously provide redundancy in case a sensor is compromised due to component failure or due to tampering.

Additionally, at block 652 the processor infrequently polls the accelerometers. In one embodiment, it can be advantageous to infrequently poll the accelerometers because the processor has potentially multiple tasks to perform, and reducing the amount of polling performed by the processor can reduce the load on the processor. Of course, in other embodiments, a separate microcontroller or processor can be used to poll and calculate accelerometer values more frequently and output these values to the processor when the situation warrants, such as when the door detector detects a door opening (or closing). Thus, for example, if the processor determines at block 654 that a door opening has been detected, it uses the accelerometers to confirm the door opening at block 656. Block 656 represents performing the process of FIG. 6A or the like. In one embodiment, in response to a door opening being detected 654, the processor can increase the sampling rate of the accelerometers so that they gather more data per second.

Further, in one embodiment, the processor prioritizes information obtained from the accelerometers instead of the door detector, since the door detector may be spoofed or fooled more easily by a user with a magnet. Thus, if the processor identifies the door closed condition from the door detector but a door open condition from the accelerometers, the processor can output an indication that the door is open. Likewise, in some embodiments, the processor indicates a door opening if either sensor (door detector or accelerometers) detects a door opening.

Once the door opening is confirmed, the processor may move the lock in the door to the striker position so that when the door closes the door will automatically lock. For instance, the processor can cause bolts in the door to extend from an unlocked position to a partially-locked position halfway to a locked position or fully to a locked position. Moving the bolts to a partially locked position or fully locked position can reduce the risk that the door will be closed without being locked. For instance, in one embodiment the bolts have chamfered edges or otherwise angled edges that permit them to be pushed downward against the frame while being closed, and which then spring forward into a locked position.

At block 660, the processor determines whether a door closure has been detected. For example, the processor can access the door detector and/or the accelerometers to make this determination. If the processor does not detect door closure, the process 650 loops back to block 660 and continues to poll the door detector and/or accelerometers. If the door is open too long, then the processor may report that the door has been open too long and report a potential tamper event to the administrative user(s). If the door closure was detected at block 660, then at block 662 the processor can determine whether the door lock sensor detects the door being locked. The door lock sensor may be a sensor that determines whether the motor has moved the bolt(s) to the locked position. For example, a switch can be actuated by movement of the bolt(s) into the locked position, or an encoder in the motor can be read by the processor to determine whether the motor has moved the bolt(s) to the locked position. If the door lock sensor indicates that the door is locked, the process 650 loops back to block 652. Otherwise, the process at block 664 reports an error to the administrative user(s) and/or on a display of the cabinet and may reattempt to lock the door (e.g., after a period of time being unlocked, such as 5 seconds, for safety reasons). A report of a door opening may also occur at block 656. Further, at block 660, the processor may report to an administrator or on the display of the cabinet an error if the door has been open for too long, such as longer than a predetermined time.

For convenience, the door opening detection algorithms herein are described primarily with respect to a single door opening vertically, but they may be equally applicable to a side-opening door or to a double door, or to a cabinet with any number of doors. With multiple doors, each door can have an accelerometer or other motion sensor (see other examples above) installed therein, and the algorithms described herein can operate with respect to each door.

IV. Recess Embodiments

Turning to FIGS. 7 through 14, another example cabinet 700 is shown. The cabinet 700 may include all of the features of the cabinet 100 and the cabinet 500 described above and may implement any of the processes 200, 600, 650 described above. In the depicted embodiment, the cabinet 700 includes a recess 710 in the rear of the cabinet. The recess 710 can enable cables to be directed out of the cabinet and above or to either side of the cabinet without having to require holes to be drilled for the cables in multiple locations.

In some prior cabinets that do not have the recess 710, the cabinets are ordered by customers with specific requests for mounting hole and/or cable hole locations. Cable holes in these prior cabinets could be drilled in the sides of the cabinet, the top, or the rear of the cabinet and may be used to conduct power cable and antenna and other cables or wires out of the cabinet. A power cable can supply power to the cabinet to control circuitry including the processor and associated circuitry and sensors described above as well as the motor. (Although the cabinet can be battery operated, it may be more secure for the cabinet to be powered by an external power source which may be supplied from the wall outlet or from a vehicle that the cabinet is installed in.)

Because cabinets may be installed in different vehicles or buildings which have different mounting configurations, it can be desirable to make the cabinet so that it can go in multiple different mounting locations without requiring holes to be drilled specifically for each cabinet in different locations. A problem has occurred where cabinets would be ordered without specifying the correct cable holes (e.g., holes would be drilled where cables could not go, such as against a wall), causing a customer to have to return a cabinet. With the recess 710, cables can be snaked out of the back of the recess to the side, directly to the back, or over the top of the cabinet to the other side of the cabinet—thus addressing this problem at least in part.

As shown in FIGS. 7 through 11, the recess 710 is depicted in the upper surface 704 of the cabinet 700. The upper wall 704 of the cabinet is a good location for the recess 710 in one embodiment because it allows extensive configurability of different cable locations. The recess 710 can also extend all the way to the wall 706 of the cabinet on one side of the cabinet, but in the depicted embodiment does not extend all the way to the opposite wall of the cabinet so as to provide an increased storage capacity of the cabinet. It is conceivable that for different sized cabinets, the recess 710 may be smaller or larger. For instance, the recess 710 may extend along the entire back length of the cabinet. The recess 710 may also be positioned at the bottom of the cabinet or around one of the sides of the cabinet instead of in the back of the cabinet.

With reference to FIGS. 7 through 11, the recess 710 is defined in one embodiment by a wall 712, a shelf 716, and a wall 714. The shelf 716 and the wall 712 are of a sufficient width to enable cables to be snaked out of the cabinet without the cables being pinched against the wall to which the rear of the cabinet is mounted. For instance, in one embodiment the shelf 716 has a depth of about 1.5 inches (about 3.8 cm). The size of the shelf 716 can be driven by the size of the cables and/or antenna used to connect to the back of the cabinet 700. If smaller cables and/or antenna are used, the shelf 716 may be narrower in depth. Likewise, the height of the wall 714 may be smaller or larger depending on the size of the cables and/or antenna used.

Figure 8:
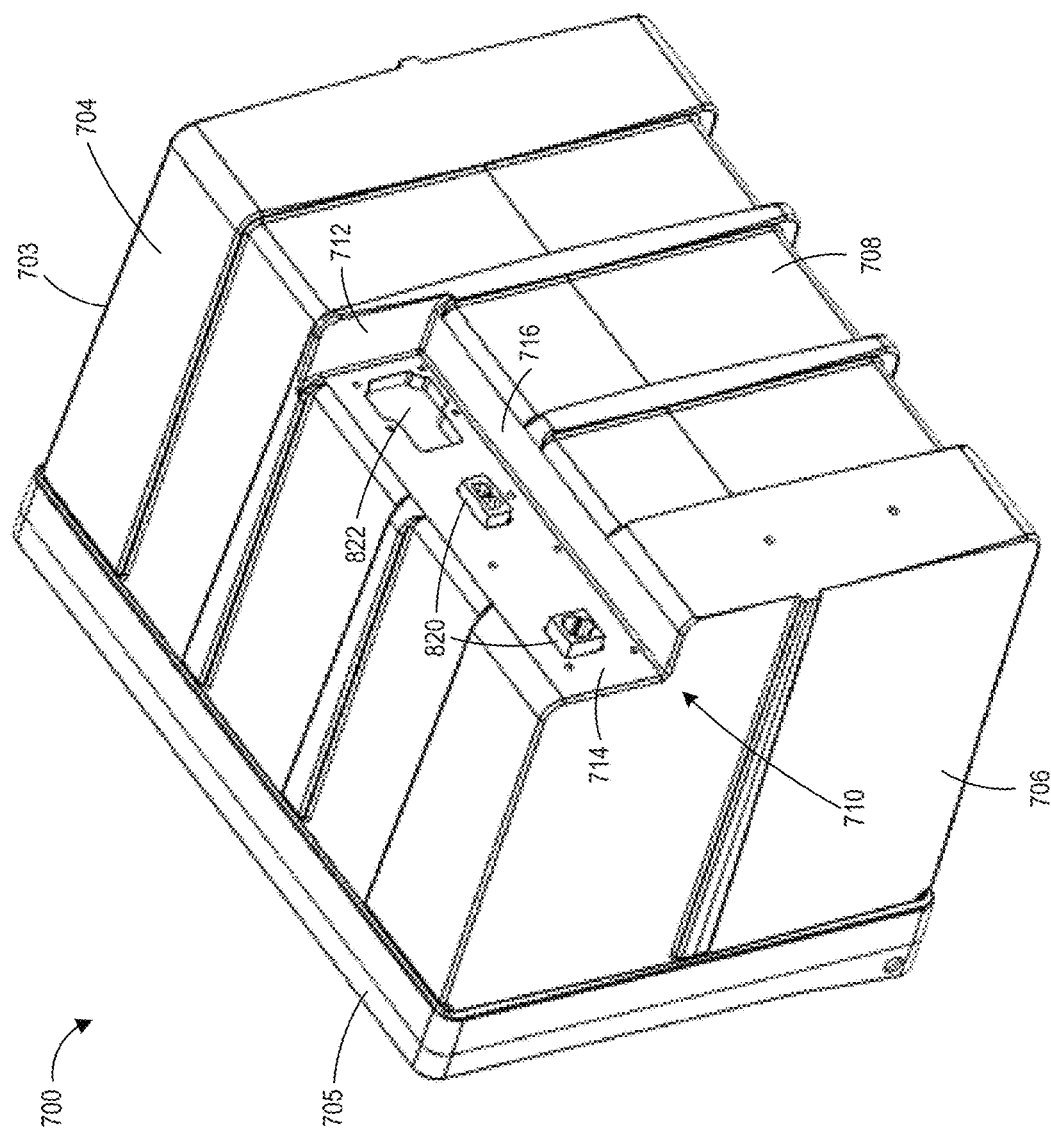
FIG. 8 is a rear perspective view of the cabinet of FIG. 7.
Figure 9:
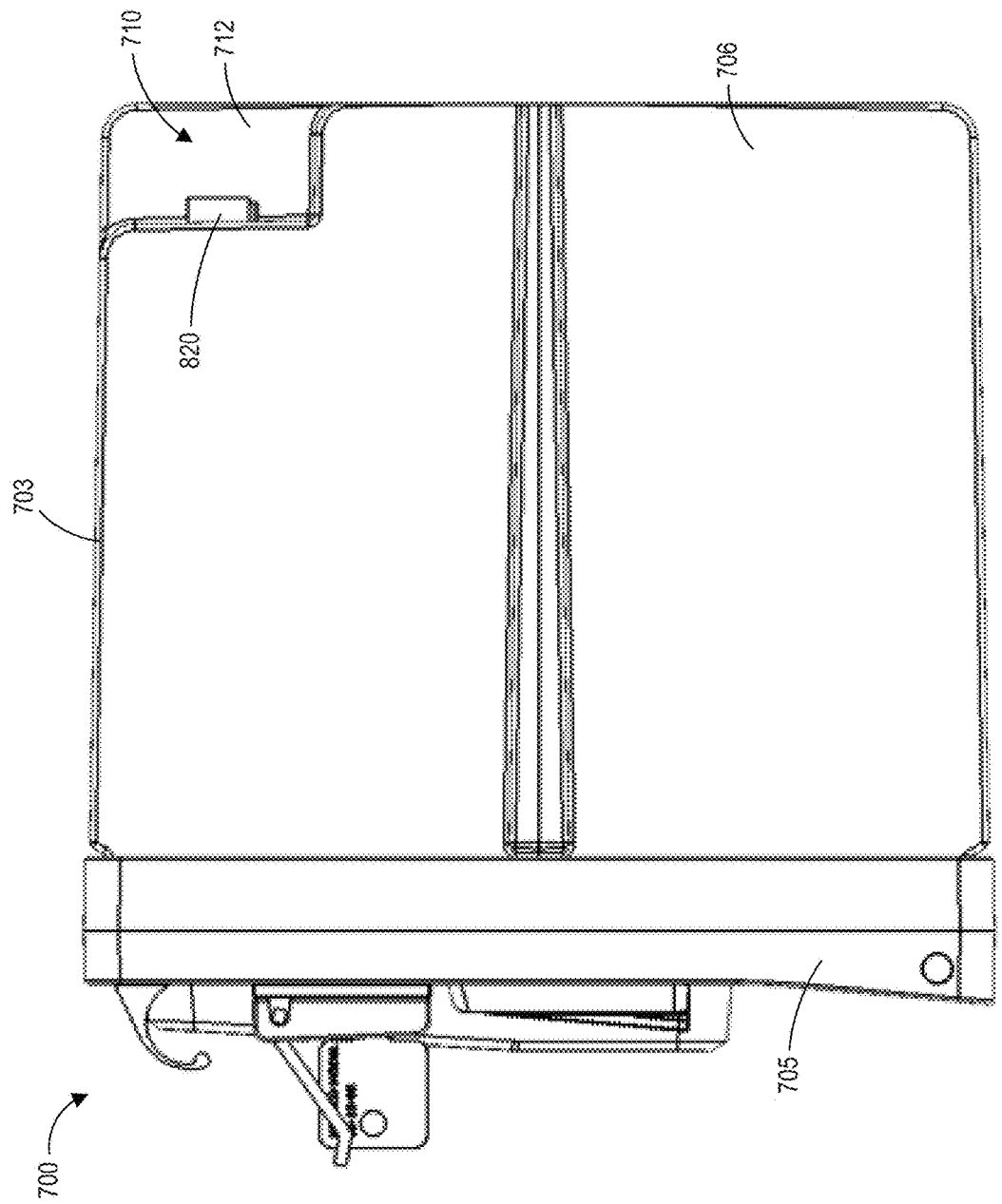
FIG. 9 is a side view of the cabinet of FIG. 7.

With respect to FIG. 8, connectors 820 are shown sticking out of the wall 714 of the recess 710. These connectors may include, for example, a power connector to connect to a power cable and a wired communications connector to connect to Ethernet or similar networking cable. A void 822 is shown for connecting to an optional antenna. The antenna can be used for wireless communication to communicate audit information from the processor or for other wireless communications purposes. The void 822 is optional in some embodiments as the antenna may be internal to the cabinet (e.g., may be a microstrip antenna on a circuit board or the like). The void 822 may be covered with a plastic material which is electrically invisible to the antenna to permit wireless communications to exit and enter the cabinet (which may otherwise be made of metal).

Figure 10:
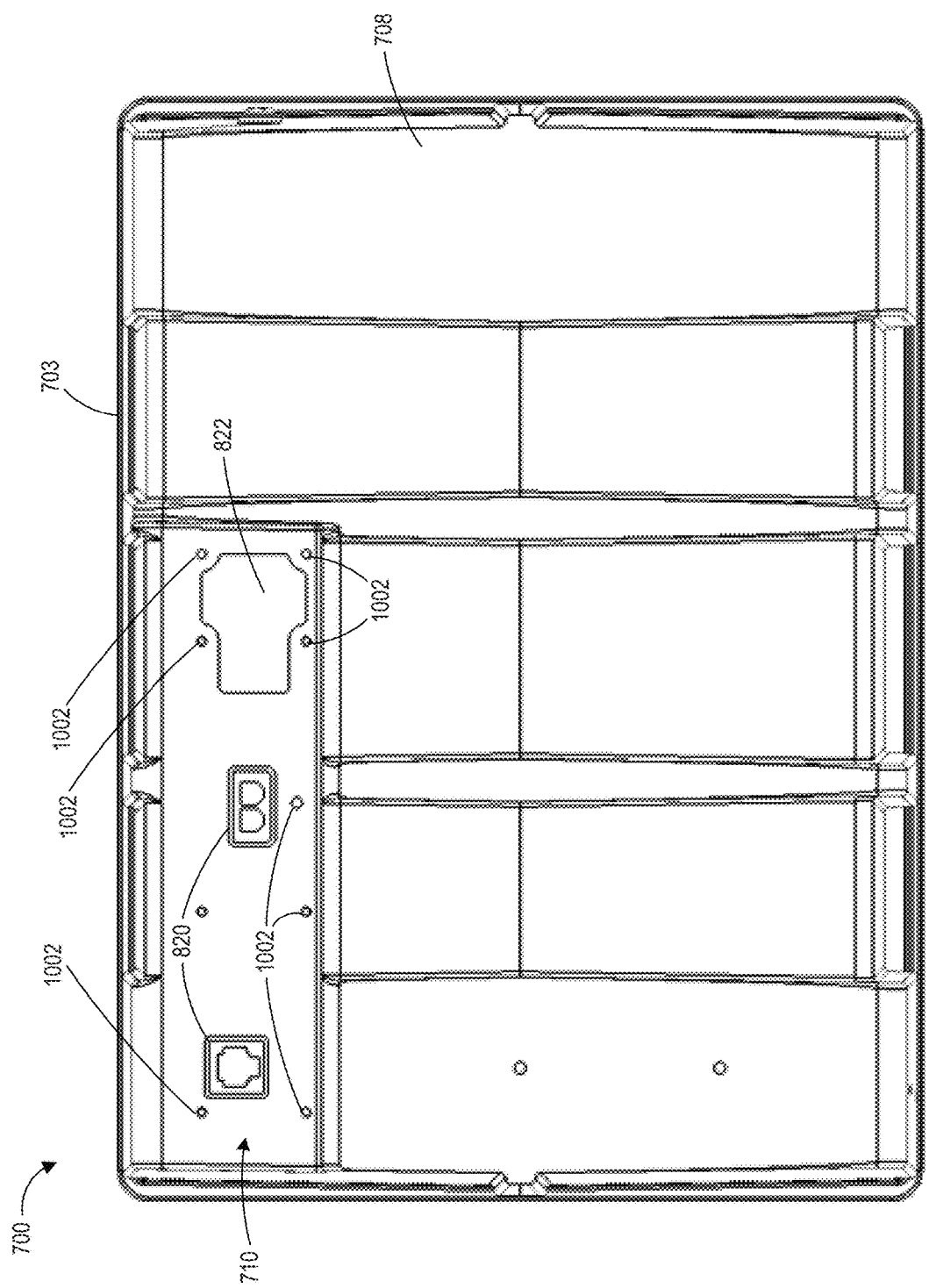
FIG. 10 is a rear view of the cabinet of FIG. 7.
Figure 11:
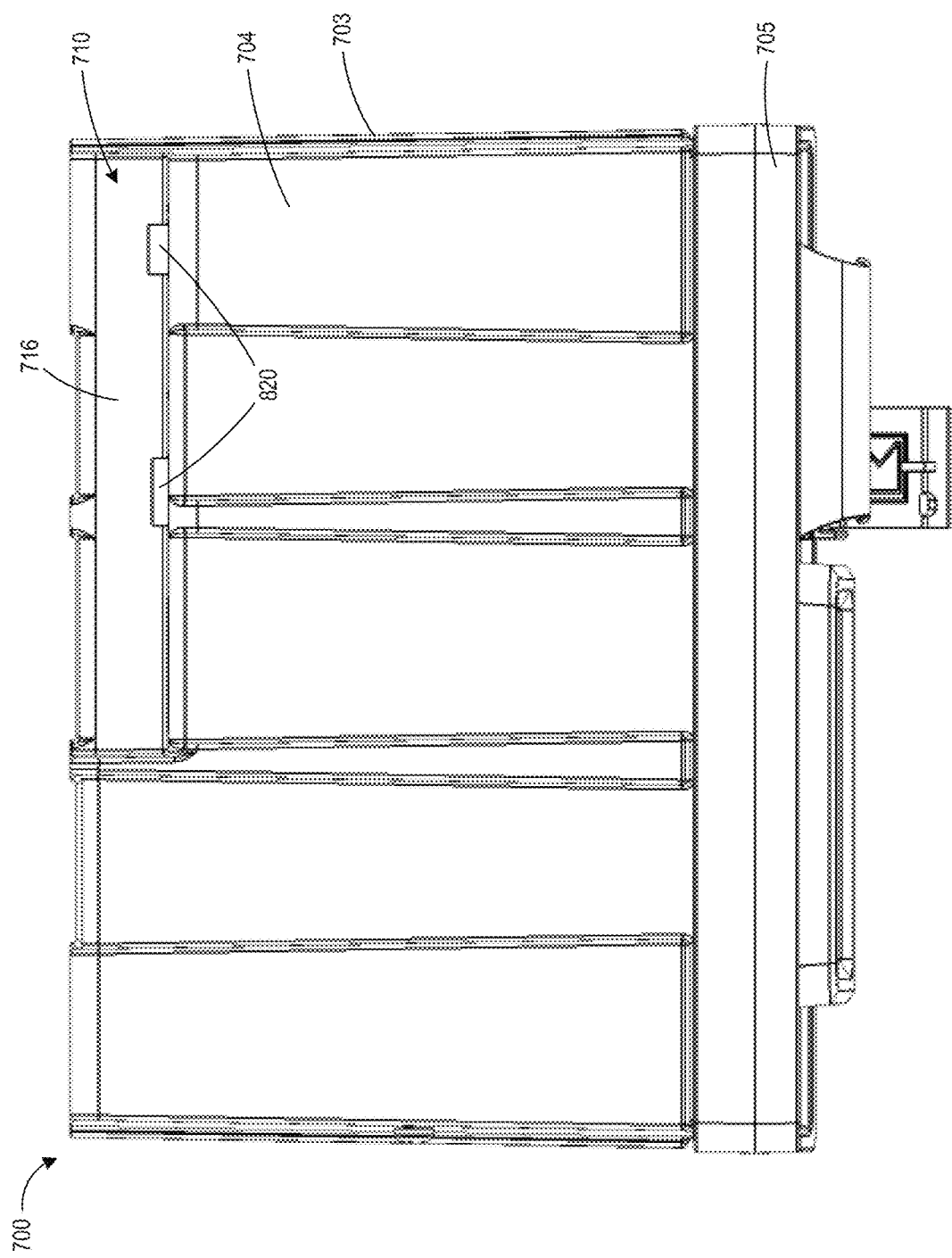
FIG. 11 is a top view of the cabinet of FIG. 7.
Figure 12:
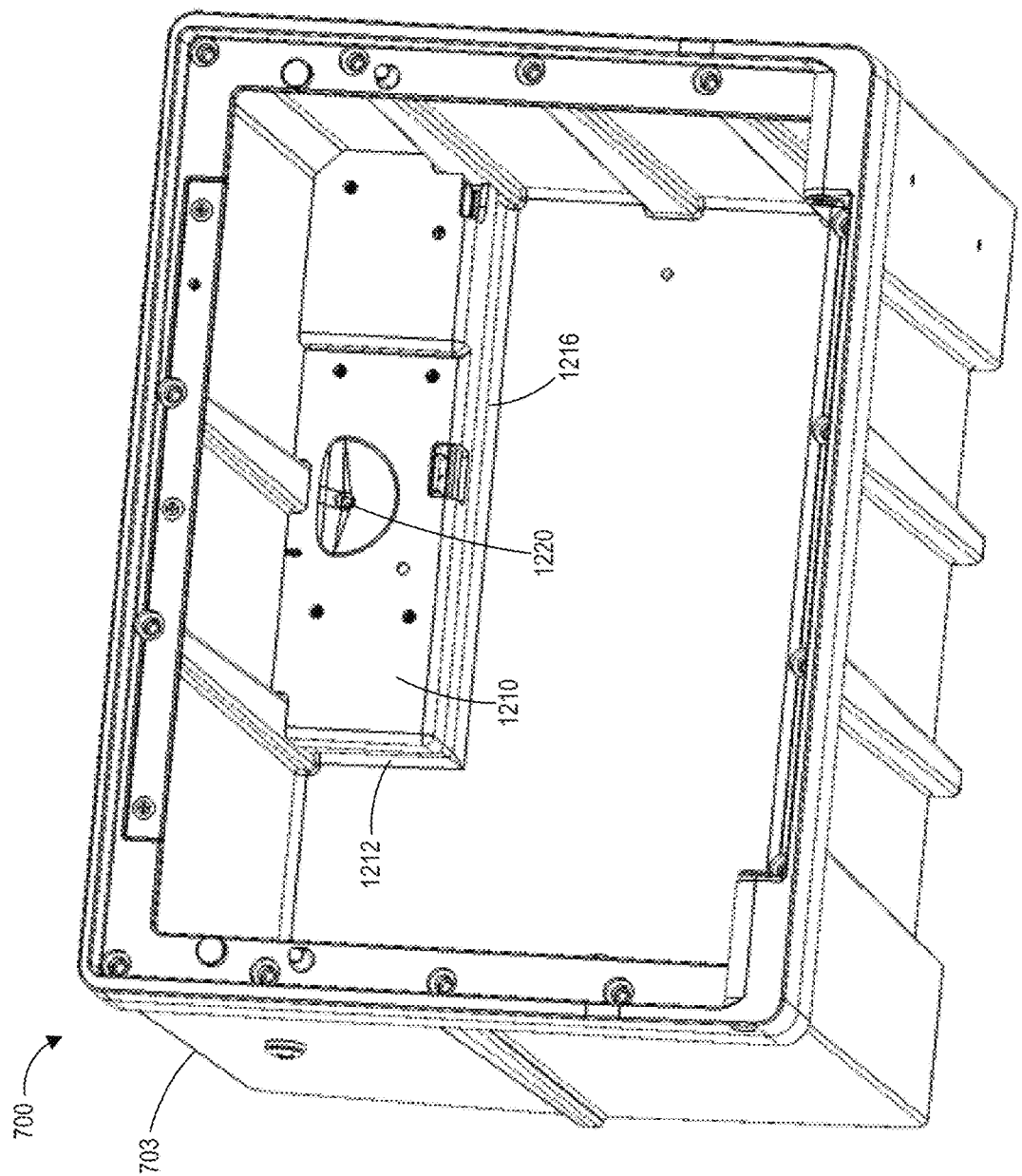
FIGS. 12 through 14 are perspective views of a frame of the cabinet of FIG. 7.

Referring specifically to FIG. 10, screw holes 1002 are provided that enable a printed circuit board to be affixed to the inner side of the wall 714 of the recess 710. This circuit board is described with respect to FIG. 13 below. Turning to FIG. 12, the inside of the frame 703 is shown with walls 1212 and 1216 corresponding to the inside of walls 712 and 716 described above, respectively. A cover 1210 is provided to cover a circuit board shown in FIG. 13, which is also screwed onto the circuit board and to the wall 1214 (inside of wall 714) via the screw holes 1002. In addition, an optional light 1220 is shown (an LED or the like), which can provide any of a variety of indications to a user.

Figure 13:
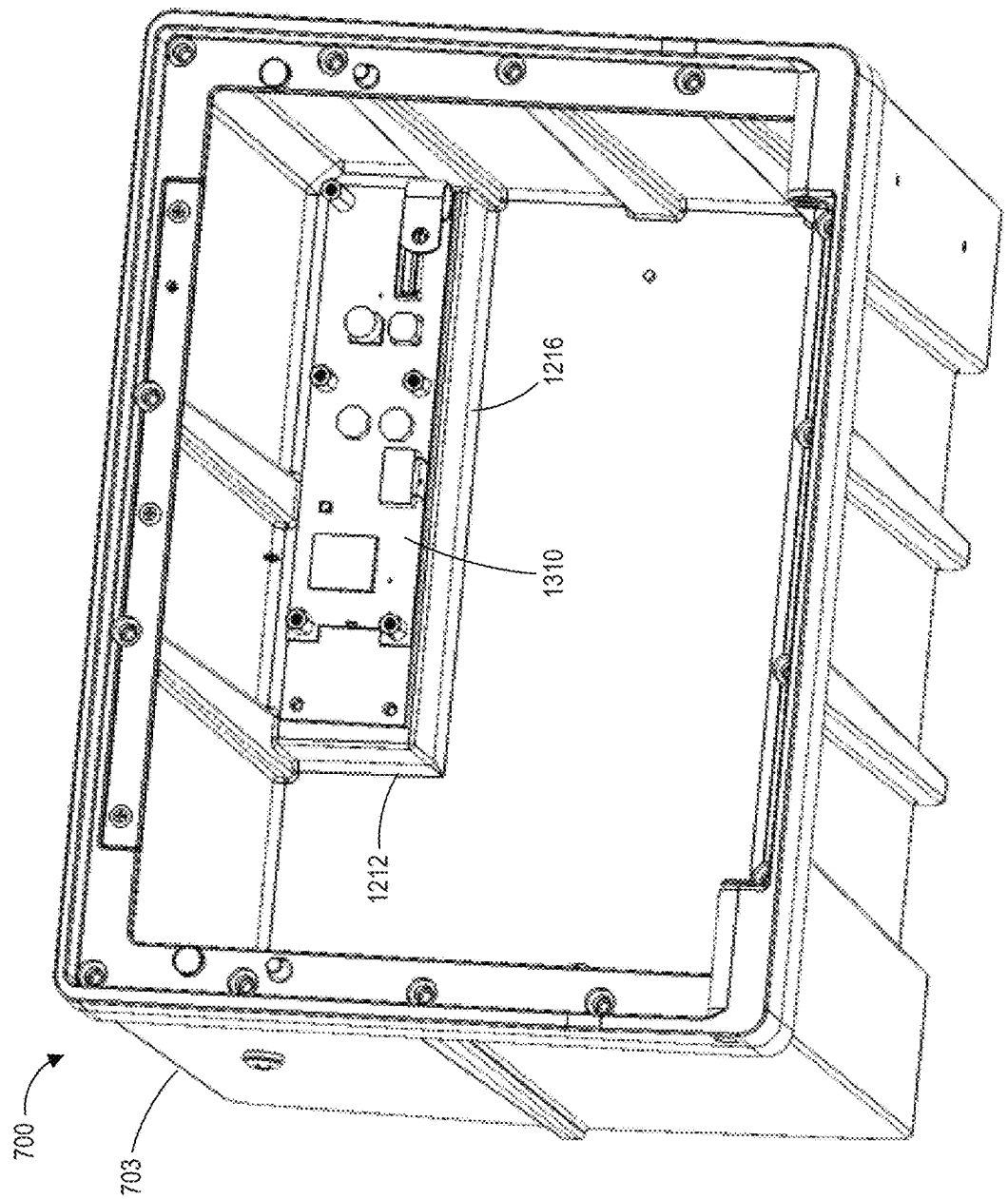
Figure 14:
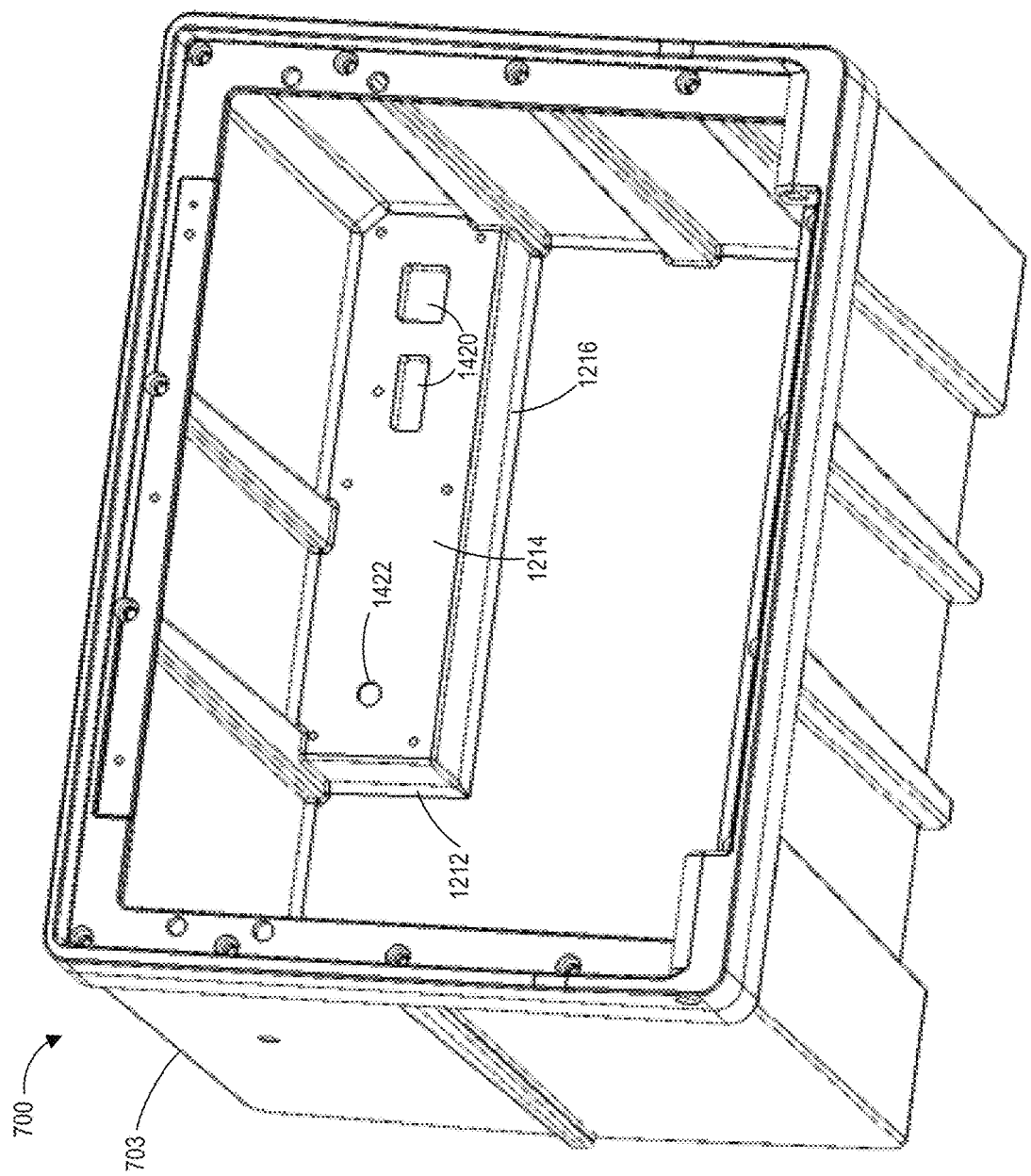

Turning to FIG. 13, the printed circuit board 1310 is shown, which is underneath the cover 1210 of FIG. 12. This circuit board 1310 is an example circuit board that can include the accelerometer for the frame 703, as well as circuitry for power and wireless communications. In some embodiments, any portion of the door circuitry described in FIG. 1 may be implemented on the circuit board 1310 instead of or in addition to in the door. The processor described above may be located on this circuit board 1310 or may be located on the circuit board in the door described below with respect to FIG. 15. FIG. 14 shows the circuit board 1310 removed so as to show the inner side of the recess formed by the recess walls 1212, 1214 and 1216. Voids 1420 and 1422 are shown which can be used to convey power communications and optional antenna ports and/or cables out of the cabinet.

Figure 15:
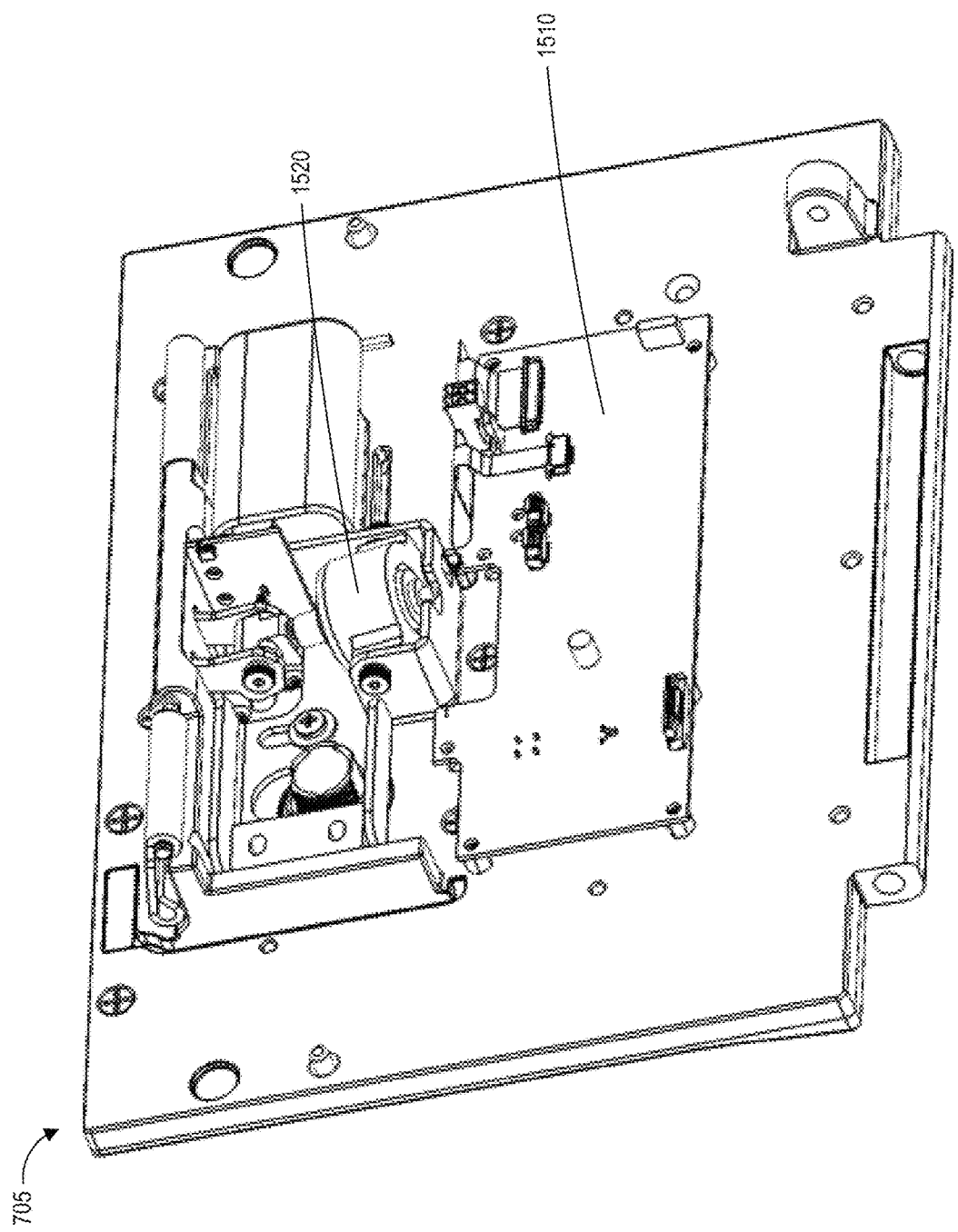
FIG. 15 is a perspective view of a door of the cabinet of FIG. 7.

Turning to FIG. 15, an example door 705 corresponding to the doors described above is shown. The door includes circuit board 1510 that can include any of the electronic circuitry described herein, including an accelerometer for the door. The location of the circuit board 1510 may be unimportant with respect to the accelerometer. The accelerometer could be located in any portion of the door. In addition, a motor is shown 1520 which can actuate the locking bolts that extend from the door as shown and described above with respect to FIGS. 3 and 4. The circuit board 1510, motor 1520, and other components shown can be covered with a cover (see, e.g., FIG. 3).

V. Example Shipping Container Embodiment

As described above, the embodiments described herein are not limited to medical storage cabinets, but can generally be applied to any container. For example, any of the features described above can be applied to a shipping container.

Figure 16:
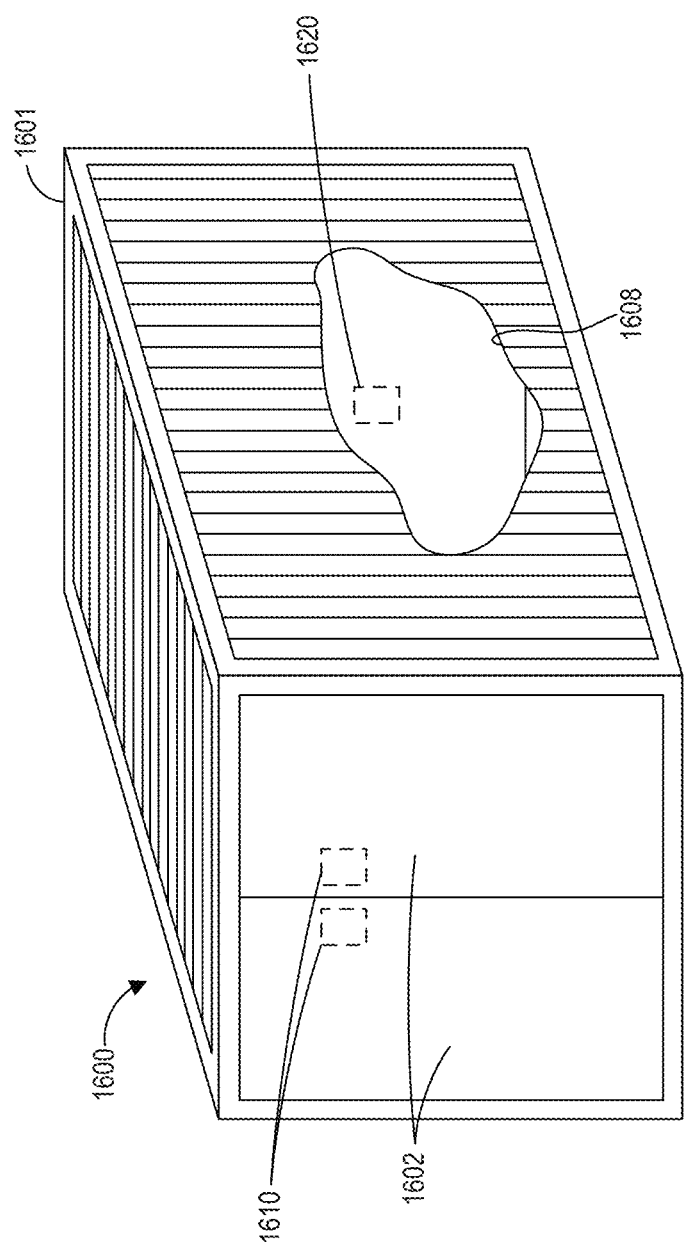
FIG. 16 is a perspective view of an example shipping container that can implement any of the features described herein.

To that end, FIG. 16 depicts an example shipping container 1600 that can implement any of the features described herein. The shipping container 1600 may be any size shipping container, including, but not limited to, 10', 20', 40', 53', and custom sized containers. The container includes two doors 1602 attached to a main body 1601. The doors 1602 can swing outward, away from a longitudinal axis of the container.

Electronics circuits 1610 are shown in phantom line, representing electronics in each of the doors 1602. The electronics circuits 1610 can include accelerometers or other movement sensors, other examples of which were described above. In addition, an electronic circuit 1620 is shown in phantom inside the container 1600, visible via an example cutaway 1608 (shown for illustrative purposes only). In this embodiment, the electronic circuit 1620 internal to the container 1600 is installed in the rear of the container 1600. However, the electronic circuit 1620 can be installed in other locations in or on the container 1600 in other embodiments. Similarly, the location of either of the circuits 1610 in the doors may be changed. In some embodiments, electronics need not be in all the doors.

The electronic circuits 1610, 1620 can implement any of the algorithms described above to determine whether or not either of the doors 1602 has been opened. In an embodiment, one or more of the circuits 1610, 1620 includes a wireless transmitter and associated antenna that can communicate data regarding door openings to a remote location, such as to a server accessible to a company that owns or uses the shipping container 1600. One or more of the circuits 1610, 1620 can also include a memory that stores data regarding door openings, among other data.

VI. Additional Embodiments

In various embodiments, there may be more than two movement sensors used in any embodiment. There may be more than two accelerometers in the door and more than two accelerometers in the frame. In another embodiment, one or more accelerometers are used in the door, and none are used in the frame.

VII. Terminology

The features described herein can be implemented together with any subcombination of the features described in U.S. Pat. No. 8,339,261, titled "System and Method of Monitoring the Door of a Secure Cabinet For Holding Pharmaceutical Products," filed Jul. 1, 2009, the disclosure of which is hereby incorporated by reference in its entirety.

Many other variations than those described herein will be apparent from this disclosure. For example, depending on the embodiment, certain acts, events, or functions of any of the algorithms described herein can be performed in a different sequence, added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A storage container, the storage container comprising:
   a frame that defines a partially enclosed space configured to receive medical pharmaceuticals, wherein the frame defines an opening;
   a door mounted to the frame so as to be movable between an open position, whereby access to the medical pharmaceuticals can be obtained, and a closed position whereby the medical pharmaceuticals can be secured within the partially enclosed space;
   a locking mechanism that secures the door to the frame in the closed position; and
   a lock verification system comprising:
      a first accelerometer disposed in the door and configured to generate a first output,
      a second accelerometer disposed in the frame and configured to generate a second output, and
      a processor programmed to perform a calculation based on the first output and the second output to identify whether the door is open or closed, wherein the processor is further configured to determine motion of the frame by comparing the first output and the second output, and wherein determination of whether the door is open or closed is based at least in part on a determination of the motion of the frame.

2. The storage container of claim 1, wherein the processor is further programmed to:
  compute a first tilt angle based on the first output;
  compute a second tilt angle based on the second output;
  compute a difference between the first tilt angle and the second tilt angle; and
  compare the computed difference with a threshold to identify whether the door is open.

3. The storage container of claim 2, wherein the processor is further programmed to filter one or both of the first output and the second output prior to computing the first tilt angle and the second tilt angle.

4. The storage container of claim 1, further comprising a magnetic sensor and a magnet, one of the magnetic sensor and the magnet disposed in the door and the other disposed in the frame, such that when the door is closed, the magnet is brought into proximity with the magnetic sensor such that the magnetic sensor detects the magnet.

5. The storage container of claim 4, wherein the magnetic sensor comprises either a reed switch or a Hall effect sensor.

6. The storage container of claim 4, wherein the processor is further configured to analyze an output of the magnetic sensor to identify whether the door is open or closed.

7. The storage container of claim 6, wherein the processor is further configured to obtain the first output and the second output in response to the magnetic sensor detecting the magnet.

8. The storage container of claim 6, wherein the processor is further configured to increase a sample rate of the first and second accelerometers in response to the magnetic sensor detecting the magnet.

9. The storage container of claim 1, further comprising a lock sensor configured to detect whether the locking mechanism has actuated.

10. The storage container of claim 9, wherein the lock sensor comprises a switch.

11. The storage container of claim 1, wherein the frame includes a recess comprising one or more ports or holes.

12. The storage container of claim 11, wherein the recess is disposed in a rear portion of the frame opposite a front portion of the frame that connects to the door.

13. The storage container of claim 12, wherein the recess extends partially along an upper portion of the frame.

14. The storage container of claim 11, wherein the recess comprises one or more of the following: a power cable port, a network cable port, and a wireless antenna port.

15. The storage container of claim 11, wherein the recess is defined by a shelf adjoining two walls, each wall adjoining the other, wherein normal vectors to each of a plurality of planes defined by the shelf and the two walls are approximately orthogonal to each other.

16. The storage container of claim 11, wherein the cabinet includes an upper surface, a bottom surface opposite the upper surface, left and right side surfaces, a rear surface, and a door opposite the rear surface.

17. The storage container of claim 16, wherein the recess comprises a wall extending downward from the upper surface partially toward the bottom surface and a shelf extending forward from the rear surface toward the door, wherein the shelf and the wall intersect to at least partially form the recess.

18. A storage container, the storage container comprising:
  a frame that defines a space configured to receive one or more items, wherein the frame defines an opening;
  at least one door mounted to the frame so as to be movable between an open position, whereby access to the one or more items can be obtained, and a closed position whereby the one or more items can be at least partially enclosed;
  a locking mechanism that secures the at least one door to the frame in the closed position; and
  a lock verification system comprising:
    at least a first movement sensor disposed in the at least one door and configured to generate a first output,
    at least a second movement sensor disposed in the frame and configured to generate a second output, and
    a processor programmed to perform a calculation based on the first output and the second output to identify whether the at least one door is open or closed, wherein the processor is further configured to determine motion of the frame by comparing the first output and the second output, and wherein determination of whether the door is open or closed is based at least in part on a determination of the motion of the frame.

19. The storage container of claim 18, wherein the storage container is a shipping container.

20. The storage container of claim 18, wherein the storage container further comprises one or both of a wireless transmitter and a memory that stores data regarding identifications by the processor of door opening events.

21. A storage container, the storage container comprising:
  a frame that defines a partially enclosed space configured to receive items, wherein the frame defines an opening;
  a door mounted to the frame so as to be movable between an open position, whereby access to the items can be obtained, and a closed position whereby the items can be secured within the partially enclosed space;
  a locking mechanism that secures the door to the frame in the closed position; and
  a lock verification system comprising:
    a first accelerometer disposed in the door and configured to generate a first output,
    a second accelerometer disposed in the frame and configured to generate a second output, and
    a processor programmed to perform a calculation based on the first output and the second output to identify whether the door is open or closed, wherein the processor is further configured to determine motion of the entire storage container by comparing the first output and the second output, and wherein determination of whether the door is open or closed is based at least in part on a determination of the motion of the entire storage container.

* * * * *